US008659564B2

(12) United States Patent
Kim et al.

(10) Patent No.: US 8,659,564 B2
(45) Date of Patent: Feb. 25, 2014

(54) TOUCH SENSIBLE DISPLAY DEVICE HAVING REDUCED NUMBER OF IMAGE DATA LINES

(75) Inventors: Sung-Man Kim, Seoul (KR); Beom-Jun Kim, Seoul (KR); Bong-Jun Lee, Seoul (KR); Hong-Woo Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 331 days.

(21) Appl. No.: 13/093,035

(22) Filed: Apr. 25, 2011

(65) Prior Publication Data

US 2011/0310035 A1    Dec. 22, 2011

(30) Foreign Application Priority Data

Jun. 18, 2010  (KR) .................... 10-2010-0058046

(51) Int. Cl.
*G06F 3/041*    (2006.01)

(52) U.S. Cl.
USPC ...................................... 345/173; 178/18.01

(58) Field of Classification Search
USPC ...................................... 345/173; 178/18.01
See application file for complete search history.

(56) References Cited

U.S. PATENT DOCUMENTS

| | | | |
|---|---|---|---|
| 6,501,529 B1* | 12/2002 | Kurihara et al. ............... 345/173 |
| 7,671,833 B2* | 3/2010 | Lee et al. ...................... 345/104 |
| 2002/0070905 A1 | 6/2002 | Kodate et al. |
| 2004/0169625 A1* | 9/2004 | Park et al. ......................... 345/87 |
| 2006/0060752 A1* | 3/2006 | Lee et al. ..................... 250/208.1 |
| 2006/0097975 A1* | 5/2006 | Lee et al. .......................... 345/98 |
| 2006/0176285 A1* | 8/2006 | Lee et al. ....................... 345/173 |
| 2007/0030221 A1* | 2/2007 | Pak et al. .......................... 345/87 |
| 2007/0046650 A1* | 3/2007 | Lee et al. ....................... 345/173 |
| 2007/0070047 A1* | 3/2007 | Jeon et al. ...................... 345/173 |
| 2007/0120789 A1* | 5/2007 | Lee et al. .......................... 345/87 |
| 2007/0170949 A1* | 7/2007 | Pak et al. ........................ 324/770 |
| 2008/0117182 A1* | 5/2008 | Um et al. ....................... 345/173 |
| 2008/0136760 A1* | 6/2008 | Kang et al. ....................... 345/87 |
| 2008/0158199 A1* | 7/2008 | Lee et al. ....................... 345/174 |
| 2008/0180400 A1* | 7/2008 | Kim et al. ...................... 345/173 |
| 2009/0009685 A1* | 1/2009 | No et al. .......................... 349/62 |
| 2009/0160787 A1 | 6/2009 | Westerman et al. |
| 2009/0231511 A1* | 9/2009 | Takahashi et al. ............... 349/61 |
| 2010/0020029 A1* | 1/2010 | Park et al. ...................... 345/173 |

FOREIGN PATENT DOCUMENTS

| | | | | |
|---|---|---|---|---|
| CN | 101281315 A | * | 10/2008 | ............. G02F 1/133 |
| JP | 2000-099268 A | | 4/2000 | |
| JP | 2000-259346 A | | 9/2000 | |
| JP | 2001-042296 A | | 2/2001 | |
| KR | 1020050000105 A | | 1/2005 | |
| KR | 1020060056633 A | | 5/2006 | |
| KR | 1020060056793 A | | 5/2006 | |
| KR | 1020070050209 A | | 5/2007 | |
| KR | 1020070080161 A | | 8/2007 | |
| KR | 1020070082959 A | | 8/2007 | |
| KR | 1020080017626 A | | 2/2008 | |
| KR | 1020080044632 A | | 5/2008 | |
| KR | 1020080070223 A | | 7/2008 | |

* cited by examiner

*Primary Examiner* — Adam J Snyder

(74) *Attorney, Agent, or Firm* — Cantor Colburn LLP

(57) ABSTRACT

A touch sensible display device includes a display panel. The display panel includes a plurality of pixels, a plurality of image data lines transferring image data signals to the plurality of pixels and each positioned between two neighboring pixels, a plurality of image scanning lines transferring image scanning signals to the plurality of pixels, a plurality of first sense data lines transferring first sense data signals and each positioned between two neighboring pixels without the image data line interposed therebetween, and a plurality of first sensing units connected with the plurality of first sense data lines and sensing a touch to the display panel.

25 Claims, 25 Drawing Sheets

TOUCH SENSIBLE DISPLAY DEVICE HAVING REDUCED NUMBER OF IMAGE DATA LINES

This application claims priority to Korean Patent Application No. 10-2010-0058046 filed on Jun. 18, 2010, and all the benefits accruing therefrom under 35 U.S.C. §119, the entire contents of which are incorporated herein by reference.

BACKGROUND OF THE INVENTION (a) Field of the Invention

The invention relates to a touch sensible display device.

(b) Description of the Related Art

Display devices such as a liquid crystal display, an organic light emitting display, a portable transmitting device, other information processing device, etc. perform their functions by using various input devices. In display devices a touch sensible member has been being used as an input device.

Users write or draw texts or figures, or execute icons by touching a finger, a touch pen (e.g., stylus), or the like on a screen on the display device with the touch sensible member, to allow a desired command to be performed. The display device determines whether or not the user's finger, the touch pen, or the like touches the screen, and touch location information to thereby display images. As the touch sensible member, a technology of incorporating a sensing element including a thin film transistor, and the like in a display unit displaying the images in the display device, has been developed.

The touch sensible member may be largely divided into a resistive type, a capacitive type, and an electro-magnetic type ("EM") in accordance with a touch sensing method.

A display device includes a display panel including pixels arranged in a matrix, and each pixel includes the thin film transistor as a switching element. The thin film transistor is connected to gate lines transmitting gate signals generated by a gate driver and connected to data lines transmitting data signals generated by a data driver. The thin film transistor serves to transmit or cut off the data signal to or from the pixel, depending on the gate signal.

The gate driver and the data driver of the display device generally include a plurality of a driving integrated chip. Since a data driving integrated circuit chip is more expensive than a gate driving integrated circuit chip, a demand for the data driving integrated chip needs to be reduced.

BRIEF SUMMARY OF THE INVENTION

An exemplary embodiment of the invention provides a touch sensible display device that includes a display panel. The display panel includes a plurality of pixels, a plurality of image data lines transferring image data signals to the plurality of pixels and each positioned between two neighboring pixels, a plurality of image scanning lines transferring image scanning signals to the plurality of pixels, a plurality of first sense data lines transferring first sense data signals and each positioned between two neighboring pixels without the image data line interposed therebetween, and a plurality of first sensing units connected with the plurality of first sense data lines and sensing a touch to the display panel.

The plurality of pixels may be arranged in a matrix including pixel rows extending in a row direction and pixel columns extending in a column direction. The plurality of image data lines and the plurality of first sense data lines may extend in the column direction, and each one of the plurality of image data lines may be disposed in every at least two pixel columns.

The plurality of image scanning lines may extend in the row direction and at least two image scanning lines may be arranged in every one pixel row. The at least two image scanning lines may be positioned above and below the one pixel row, respectively.

The device may further include a plurality of second sense data lines transferring second sense data signals, extending in the row direction, and of which each one is disposed in every at least one pixel row.

The second sense data line may be positioned between two image scanning lines adjacent to each other.

One first sensing unit may be disposed in every at least one pixel row.

The device may further include a plurality of second sensing units connected with the plurality of second sense data lines and sensing the touch of the display panel. One second sensing unit is disposed in every at least one pixel column.

The first sensing unit may also be connected with the second sense data line.

Another exemplary embodiment of the invention provides a touch sensible display device that includes a first substrate and a second substrate facing each other, a plurality of image scanning lines on the first substrate, a plurality of image data lines on the first substrate, a plurality of first sense data lines on the first substrate, and a plurality of pixel electrodes connected with the image scanning lines and the image data lines through switching elements to receive image data signal. Each of the plurality of image data lines is positioned between two neighboring pixel electrodes, respectively, and each of the plurality of first sense data lines is positioned between two neighboring pixel electrodes without the image data line interposed therebetween.

The plurality of pixel electrodes may be arranged in a matrix including pixel electrode rows extending in a row direction and pixel electrode columns extending in a column direction. The plurality of image data lines and the plurality of first sense data lines may extend in the column direction, and each one of the plurality of image data lines may be disposed in every at least two pixel electrode columns.

The plurality of image scanning lines may extend in the row direction and at least two image scanning lines may be arranged in every in pixel electrode row.

The device may further include a plurality of first sensing units connected with the plurality of first sense data lines and sensing a touch to the first substrate or the second substrate.

The device may further include a pillar-type protrusion on the second substrate and an opposed electrode on the pillar-type protrusion. The first sensing unit faces the pillar-type protrusion.

The device may further include a common voltage line on the first substrate and including a part overlapped with the first sense data line.

The device may further include a common voltage line on the first substrate and including parts adjacent at and separated from both sides of the first sense data line in a plan view of the display device.

The device may further include a plurality of second sense data lines extending in the row direction and of which each one is disposed in every at least one pixel electrode row.

The device may further include a plurality of second sensing units connected with the plurality of second sense data lines and sensing the touch of the first substrate or the second substrate.

The first sensing unit may also be connected with the second sense data line.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1:
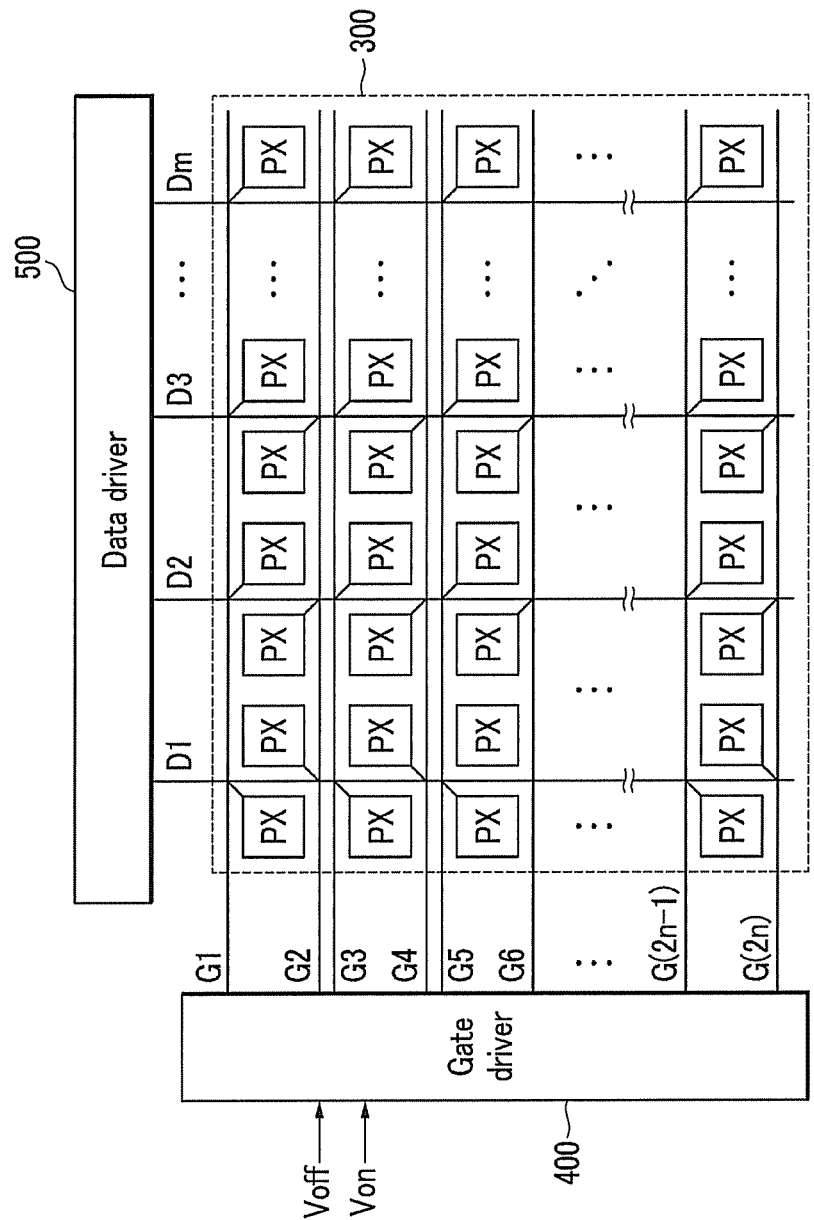
FIG. 1 is a block diagram of an exemplary embodiment of a display device, in terms of pixels, according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention. In the drawings, the thickness of layers, films, panels, regions, etc., are exaggerated for clarity. Like reference numerals designate like elements throughout the specification.

It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. As used herein, the term "connected" may indicate physically and/or electrically connected.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Hereinafter, a touch sensible display device according to an exemplary embodiment of the invention will be described in detail with reference to the accompanying drawings.

Figure 7:
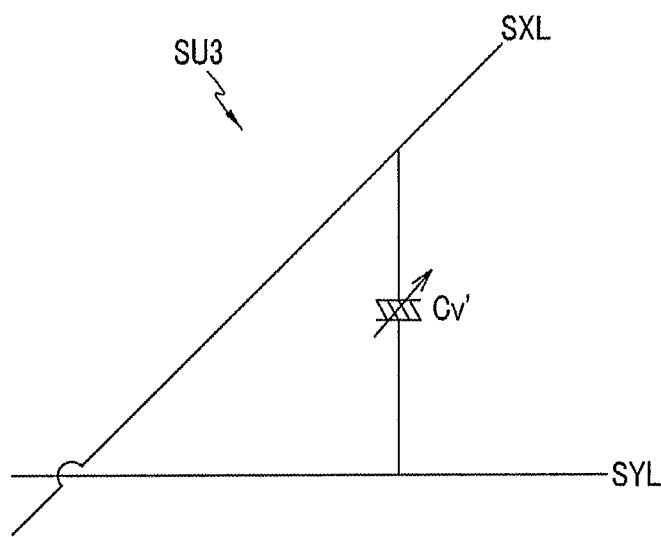
FIG. 7 is an equivalent circuit diagram of an exemplary embodiment of a sensing unit of the display device shown in FIG. 6.

Referring to FIGS. 1 and 7, an exemplary embodiment of a touch sensible display device, according to the invention will be described in detail.

Figure 2:
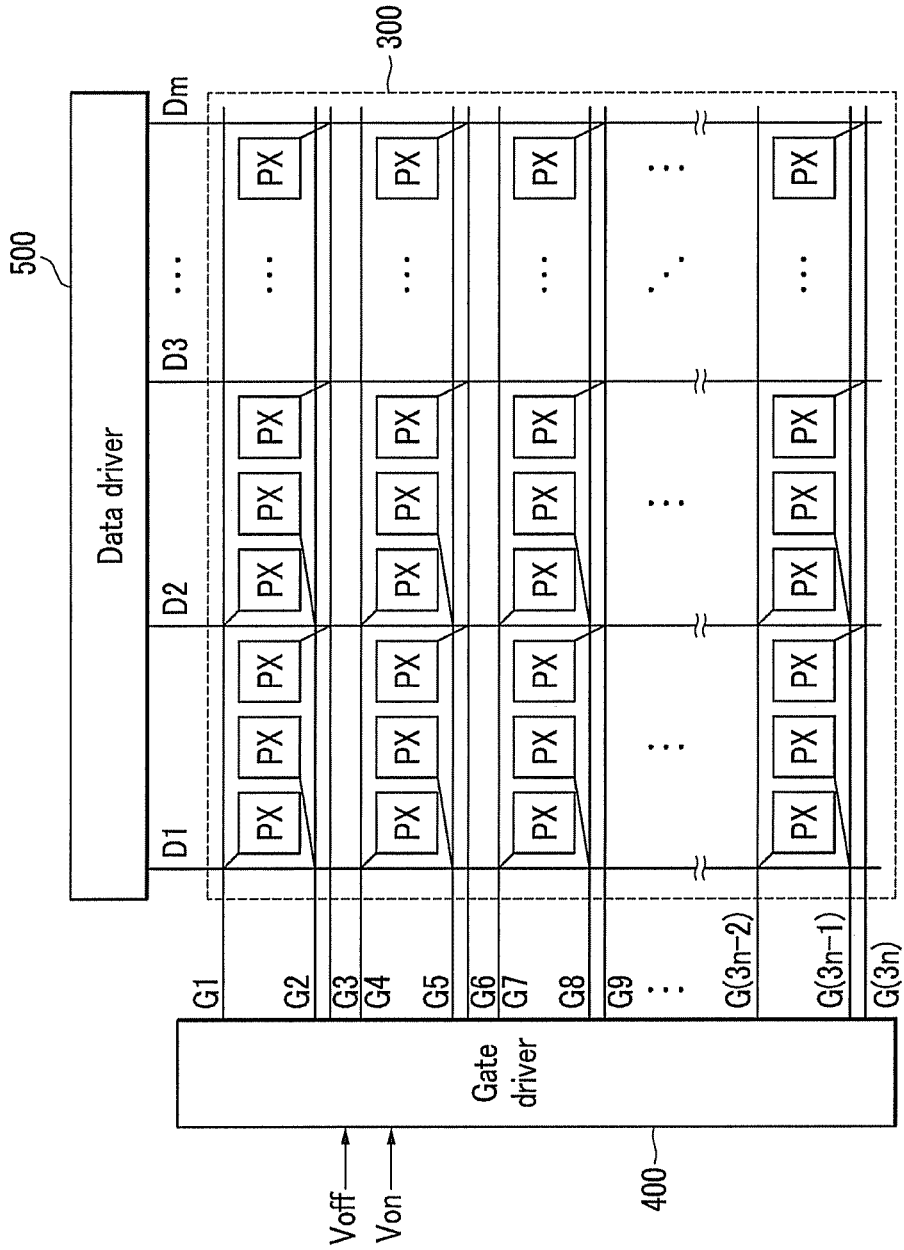
FIG. 2 is a block diagram of another exemplary embodiment of a display device, in terms of pixels, according to the invention.
Figure 3:
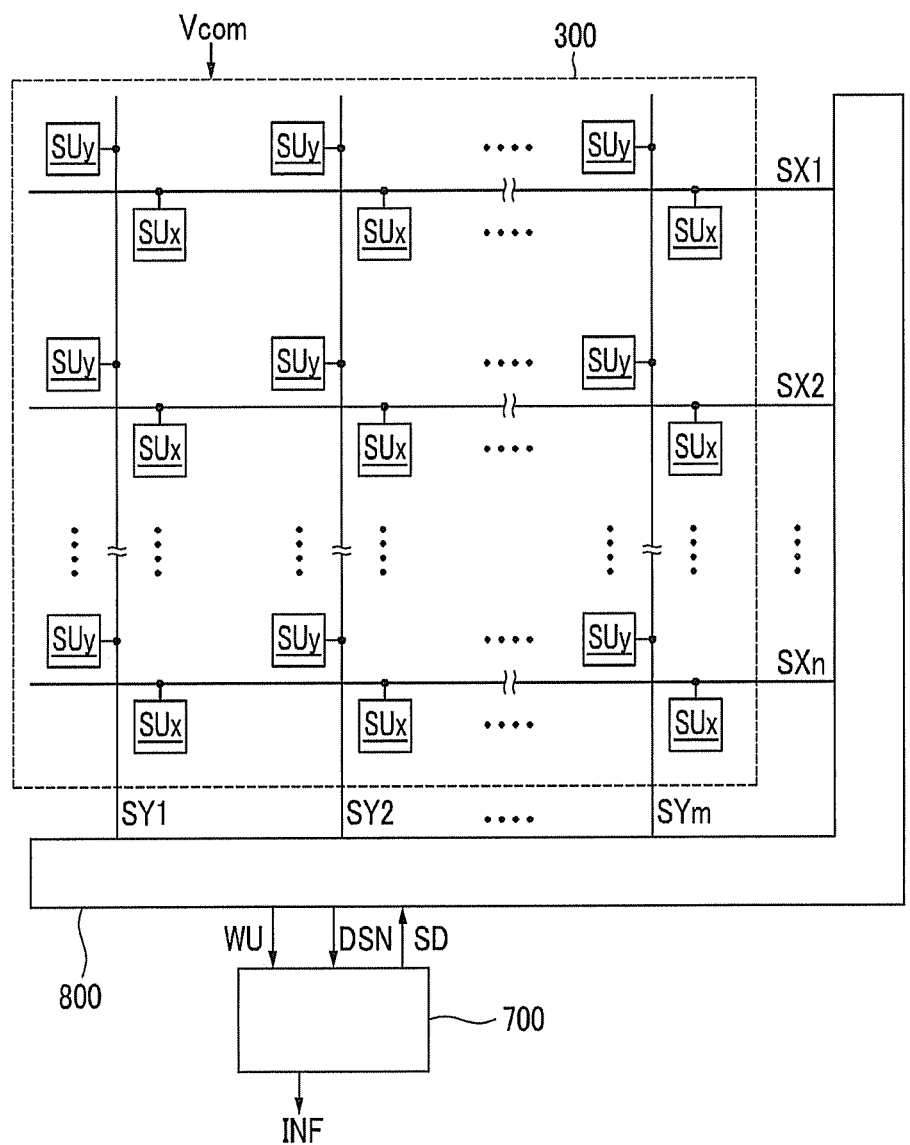
FIG. 3 is a block diagram of an exemplary embodiment of a display device, in terms of sensing units, according to the invention.
Figure 4:
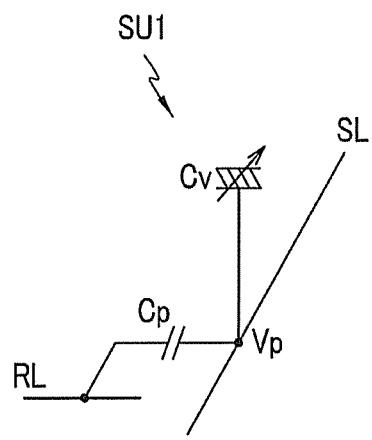
FIGS. 4 and 5 are equivalent circuit diagrams of exemplary embodiments of one sensing unit of the display device shown in FIG. 3.
Figure 5:
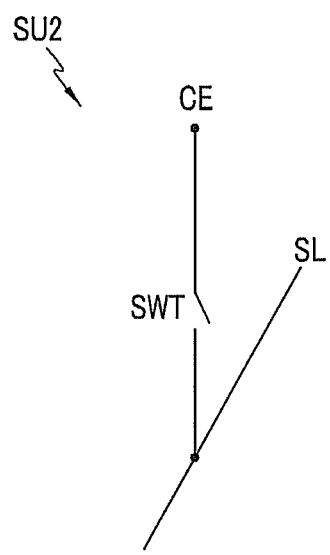
Figure 6:
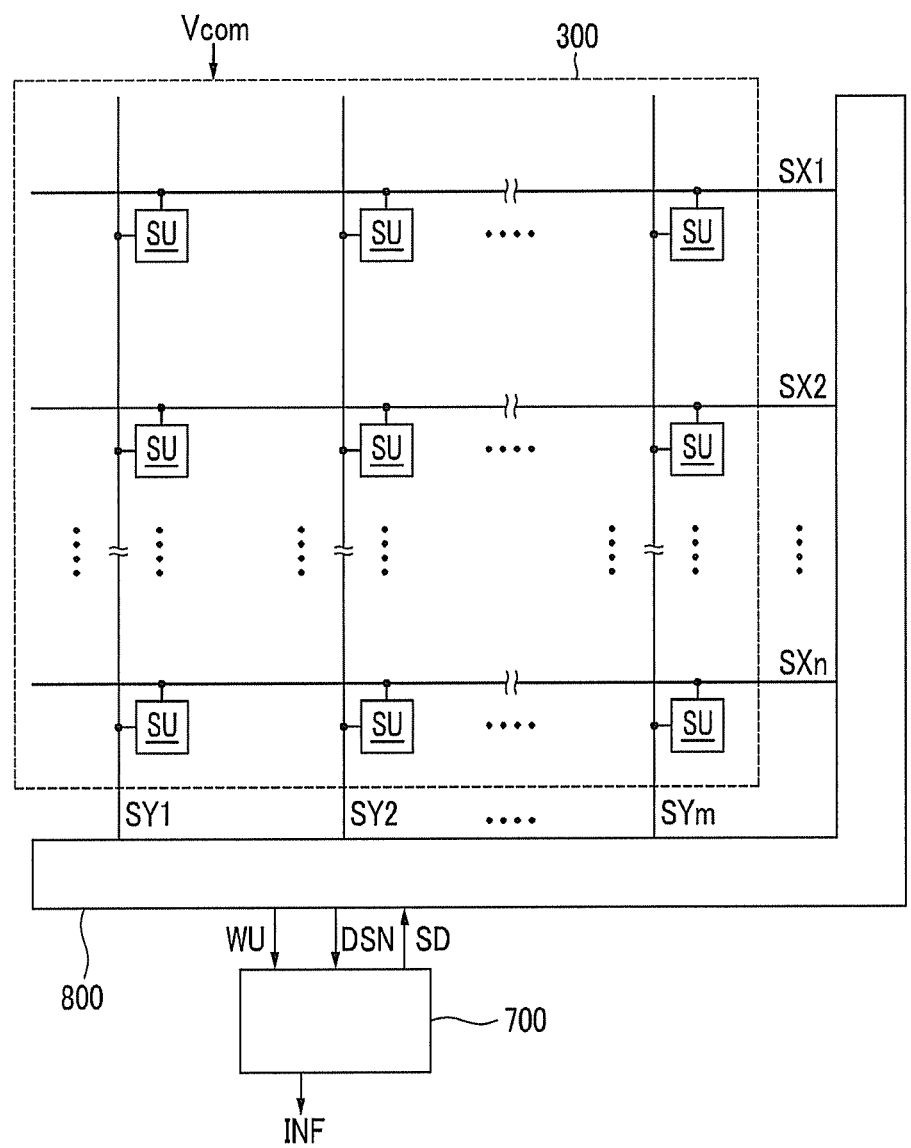
FIG. 6 is a block diagram of another exemplary embodiment of a display device, in terms of sensing units, according to the invention.

FIG. 1 is a block diagram of an exemplary embodiment of a display device, in terms of pixels, according to the invention, FIG. 2 is a block diagram of another exemplary embodiment of a display device, in terms of pixels, according to the invention, FIG. 3 is a block diagram of an exemplary embodiment of a display device, in terms of sensing units, according to the invention, FIGS. 4 and 5 are equivalent circuit diagrams exemplary embodiments of one sensing unit of the display device shown in FIG. 3, FIG. 6 is a block diagram of another exemplary embodiment of a display device, in terms of sensing units, according to the invention, and FIG. 7 is an equivalent circuit diagram of an exemplary embodiment of a sensing unit of the display device shown in FIG. 6.

The display device of the invention may be various display devices such as a liquid crystal display, an organic light emitting display, an electrophoretic display, a plasma display, and the like.

Referring to FIGS. 1, 2, 3, and 6, the display device of the invention includes a display panel 300, a gate driver 400 including a plurality of a gate driving integrated chip, a data driver 500 including a plurality of a data driving integrated chip, and a sense signal processor 800 that are connected to the display panel 300, and a touch determinator 700 connected to the sense signal processor 800.

Referring to FIG. 1, the display panel 300 includes a plurality of display signal lines G1 to G($2n$) and D1 to Dm. The display panel 300 further includes a plurality of a pixel PX, which may be connected with the plurality of display signal lines and arranged substantially in a matrix in an equivalent circuit.

The display signal lines G1 to G($2n$) and D1 to Dm include a plurality of image scanning lines G1 to G($2n$) transferring image scanning signals, and image data lines D1 to Dm transferring image data signals. A gate driving integrated chip and a data driving integrated chip may be respective connected to the display signal lines G1 to G($2n$) and D1 to Dm.

The image scanning lines G1 to G($2n$) and horizontal sense data lines SX1 to SXn (FIGS. 3 and 6) may extend substantially in a first (e.g., row) direction and may be substantially parallel to each other. The image data lines D1 to Dm and vertical sense data lines SY1 to SYm (FIGS. 3 and 6) may extend in a second (e.g., column) direction and may be substantially parallel to each other.

Each pixel PX receives an image data signal through a switching element (not shown) such as a thin film transistor, or the like which is connected to the display signal lines G1 to G($2n$) and D1 to Dm. Each pixel PX displays any one of primary colors, and allows a desired color to be recognized by spatial and temporal sums of the primary colors in order to implement color display. In an exemplary embodiment, for example, the primary colors may include a red color, a green color, and a blue color. A group of pixels PX in the matrix arrangement may be arranged in a row extending in the first direction. A group of pixels PX in the matrix arrangement may be arranged in a column extending in the second direction.

Referring to FIG. 1, a pair of image scanning lines G1 and G2, G3 and G4, . . . , G($2n-1$) and G($2n$) are positioned above and below one pixel row, respectively, such that the pair of image scanning lines are considered "neighboring" to the one pixel row. The pixels PX of one pixel row are connected to different image scanning lines of the pair of neighboring image scanning lines G1 and G2, G3 and G4, . . . , G($2n-1$) and G($2n$), respectively above and below the pixels PX, so as to receive an image scanning signal. The pixels PX in the one pixel row, may include a first group of pixels PX connected to a first image scanning line (e.g., G1, G3, . . . , G($2n-1$)) positioned above the one pixel row, and a second group of pixels PX connected to a second image scanning line (e.g. G2, G4. . . . , G($2n$)) positioned below the one pixel row, in the plan view. That is, the image scanning lines G1 to G($2n$) and the pixel rows are arranged in a two-to-one correspondence.

Further, each one of the image data lines D1 to Dm is connected to a separate pair of two pixel columns, such that two image data lines are not connected to a common pixel column. That is, each one of the image data lines D1 to Dm is arranged between pixel columns of a pair of pixel columns, and two pixels PX are arranged between adjacent image data lines. Referring to FIG. 1, pixels PX of odd-number-th pixel columns may be connected to image data lines D1 to Dm that are directly right and adjacent thereto through switching elements, and pixels PX of even-number-th pixel columns may be connected to image data lines D1 to Dm that are directly left and adjacent thereto through the switching elements. That is, the image data lines D1 to Dm and the pixel columns are in a one-to-two correspondence.

Referring to FIG. 2, the display device of the invention may include image scanning lines G1 to G($3n$) which is more than the image scanning lines G to G($2n$) of the display device shown in FIG. 1, and may include image data lines D1 to Dm which is less than the image data lines D1 to Dm of the display device shown in FIG. 1. In the illustrated embodiment, three image scanning lines G1, G2, and G3, . . . , G($3n-2$), G($3n-1$), and G($3n$) are positioned above and below each pixel row, respectively. That is, the image scanning lines G1 to G($3n$) and the pixel rows are arranged in a three-to-one correspondence.

In FIG. 2, one image scanning line G1, G4, . . . , G($3n-2$) is positioned above each pixel row in the plan view, and two image scanning lines G2 and G3, . . . , G($3n-1$) and G($3n$), are positioned below each pixel row, but the invention is not limited thereto. The pixels PX of one pixel row are connected to different ones of three neighboring image scanning lines G1, G2, and G3, . . . , G($3n-2$), G($3n-1$), and G($3n$) above or below the pixels to receive the image scanning signal.

Further, in the illustrated embodiment shown in FIG. 2, three pixels PX are disposed between adjacent image data lines, such that each one of the image data lines D1 to Dm is arranged according to groups of three pixel columns. Two pixels of the three pixels PX arranged between two neighboring image data lines D1 to Dm may be connected to a same one image data line D1 to Dm of the adjacent image data lines D1 to Dm, and a remainder of the three pixels PX may be connected to the other image data line D1 to Dm of the adjacent image data lines D1 to Dm. Each of the three pixels PX between adjacent image data lines is connected to a different image scanning line.

The connection relationship of the pixels PX and the display signal lines G1 to G($2n$), G1 to G($3n$), and D1 to Dm shown in FIGS. 1 and 2 are exemplary embodiments, and the connection relationship and arrangement may be changed. Further, in addition to the exemplary embodiments shown in FIGS. 1 and 2, in the display device of the invention, one image data line D1 to Dm may be arranged for each of various numbers of pixel columns by decreasing a total number of the image data lines D1 to Dm.

Since the total number of image data lines Dm can be decreased, as shown in FIG. 2 compared to FIG. 1, the number of data driving integrated chips of the data driver 500 may be decreased.

Referring to FIGS. 3 and 6, the display panel 300 further includes a plurality of sense signal lines SX1 to SXn and SY1 to Sym, and a plurality of sensing units SUx, SUy, and SU that may be connected the plurality of sense signal lines and arranged substantially in a matrix.

The plurality of sense signal lines SX1 to SXn and SY1 to SYm include a plurality of horizontal sense data lines SX1 to SXn, and a plurality of vertical sense data lines SY1 to SYm as a plurality of sense data lines transferring sense data signals. The sense (data) signal lines SX1 to SXn and SY1 to SYm may further include a plurality of reference voltage lines (not shown) transferring reference voltage.

Referring to FIG. 3, the sensing units SUx and SUy include a first sensing unit SUx connected to the horizontal sense data lines SX1 to SXn, and a second sensing unit SUy connected to the vertical sense data lines SY1 to Sym. In the illustrated embodiment, one individual sensing unit SU is connected only to a horizontal sense data line SX or a vertical sense data line SY, but not both. Each of the sensing units SUx and SUy may have the structure of a sensing unit SU1 shown in FIG. 4 or the structure of a sensing unit SU2 shown in FIG. 5.

Referring to FIG. 4, an exemplary embodiment of the sensing unit SU1 includes a variable capacitor Cv connected with the sense data lines SX1 to SXn and SY1 to SYm represented by reference numeral SL, and a reference capacitor Cp connected between the sense data line SL and the reference voltage line RL. The reference capacitor Cp may be overlapped with the reference voltage line RL and the sense data line SL with an insulator interposed therebetween. The variable capacitor Cv may use the sense data line SL and another electrode (not shown) as both terminals.

A value of the capacitance of the variable capacitor Cv may be changed by external stimulation such as user's touch, or the like which is applied to the display device. An example of the external stimulation may include, but is not limited to, pressure. When the pressure is applied, a distance between both terminals of the variable capacitor Cv is changed, as a result, the capacitance of the variable capacitor Cv is changed. When the capacitance is changed, the amplitude of contact voltage Vp between the reference capacitor Cp and the variable capacitor Cv which depends on the size of the capacitor is changed, and the contact voltage Vp as a sense data signal flows on the sense data line SL, such that contact or not may be determined on the basis of the contact voltage Vp.

Referring to FIG. 5, another exemplary embodiment of the sensing unit SU2 includes a switch SWT connected to the sense data line SL. The switch SWT uses a common electrode CE and the sense data line SL as both terminals thereof. Since at least one of both terminals protrudes, both terminals may be physically and electrically connected with each other by the user's touch. As a result, predetermined voltage such as common voltage Vcom, or the like form the common electrode CE is outputted to the sense data line SL as the sense data signal. When the sensing unit SU2 is adopted, the reference voltage line RL shown in FIG. 4 may be omitted.

In addition to the exemplary embodiments in FIGS. 4 and 5, each of the sensing units SUx and SUy may have various structures capable of sensing external touch by a resistive type.

Referring to FIG. 6, another exemplary embodiment of the sensing unit SU included in the display device, one individual sensing unit SU may be connected to both a horizontal sense data line SX of the horizontal sense data lines SX1 to SXn and a vertical sense data line of the vertical sense data lines SY1 to SYm. More specifically, the individual sensing unit SU is connected both to exactly one of the horizontal sense data lines SX1 to SXn, and exactly one of the vertical sense data lines SY1 to SYm. The sensing unit SU may have the structure of a sensing unit SU3 shown in FIG. 7.

Referring to FIG. 7, the sensing unit SU3 includes a variable capacitor Cv' where a portion of the horizontal sense data lines SX1 to SXn represented by reference numeral SXL, and a portion of the vertical sense data lines SY1 to SYm represented by reference numeral SYL are overlapped with each other, such as in a plan view of the display device.

A value of the capacitance of the variable capacitor Cv' may be changed by the external stimulation such as the user's touch, or the like which is applied to the display device. That is, when an external simulation object such as a user's hand is positioned between two sense data lines SXL and SYL, a dielectric constant of a dielectric of the variable capacitor Cv' is changed, as a result, the capacitance of the variable capacitor Cv' is changed. As the capacitance of the variable capacitor Cv' is changed, the sense data signals of the sense data lines SXL and SYL are changed and contact or not may be determined based on the sense data signals.

Referring to FIGS. 3 and 6, an x coordinate of a contact location may be determined by analyzing the sense data signals that flow on the horizontal sense data lines SX1 to SXn, and a y coordinate of a contact location may be determined by analyzing sense data signals that flow on the vertical sense data lines SY1 to SYm.

Further, the sensing units SUx, SUy, and SU may be arranged between two neighboring pixels PX. The densities of the sensing units SUx, SUy, and SU that are arranged adjacent to each other at regions where the horizontal sense data lines SX1 to SXn and the vertical sense data lines SY1 to SYm cross each other, that is, sense resolutions, may be various. Description thereof will be described in regards to the arrangement of the pixels and the signal lines.

The sensing units SUx, SUy and SU of the display device of the exemplary embodiments are not limited to the above-mentioned exemplary embodiments, and may be configured in accordance with various types such as a resistive type, a capacitive type, an ultrasonic type, an infrared type, an electromagnetic induction type, and the like. The structure and arrangement of the sense data lines, and the like, may also be changed in accordance with the types.

Referring back to FIGS. 1 and 2, the gate driver 400 is connected to the image scanning lines G1 to G(2n) of the display panel 300 to apply an image scanning signal, formed by the combination of gate on voltage Von turning on the switching element of the pixel PX and gate off voltage Voff turning off the switching element of the pixel PX, to the image scanning lines G1 to Gn.

The data driver 500 is connected to the image data lines D1 to Dm of the display panel 300 and applies the image data signal to the image data lines D1 to Dm.

Referring to FIGS. 3 and 6, the sense signal processor 800 is connected to the sense data lines SX1 to SXn and SY1 to SYm of the display panel 300 to receive the sense data signal, perform signal processing such as amplification, filtering, and the like, and perform analog-digital conversion of the corresponding sense data signal to generate a digital sense signal DSN. Further, the sense signal processor 800 may generate a wakeup signal WU by using the generated digital sense signal DSN.

The touch determinator 700 receives the digital sense signal DSN from the sense signal processor 800 and performs predetermined computation of the received digital sense signal to determine touch or not and a touch location. The touch determinator 700 may send out touch information INF to an external apparatus, and send out a standby signal SD to the sense signal processor 800. The touch determinator 700 monitors operation states of the sensing units SUx, SUy, and SU to control signals applied to the sensing units SUx, SUy, and SU on the basis of the digital sense signal DSN.

Each of the drivers 400, 500, 700, and 800 may be directly mounted on the display panel 300 in the form of at least one integrated circuit chip, mounted on a flexible printed circuit film (not shown), attached to the display panel 300 in the form of a tape carrier package ("TCP"), or mounted on an additional printed circuit board (not shown). Contrary to this, the data driver 500, and the like may be integrated on the display panel 300 together with various signal lines G1 to G(2n), D1 to Dm, SX1 to SXn, and SY1 to SYm and the thin film transistor.

Hereinafter, a display operation and a sensing operation of the display device will be described in more detail.

Referring back to FIG. 1, the data driver 500 applies the image data signal in the pixels PX of one pixel row to the corresponding image data lines D1 to Dm, and the gate driver 400 applies the gate on voltage Von to the image scanning lines G1 to G(2n) (G1 to G(3n) in FIG. 2) to turn on the switching element connected to the image scanning lines G1 to G(2n) (G1 to G(3n) in FIG. 2). Then, the image data signals applied to the image data lines D1 to Dm are applied to the corresponding pixels PX through the turned on switching element.

By repeating the process by the unit of one horizontal period (referred to as "1H", the same as one period of a horizontal synchronization signal Hsync and a data enable signal DE), the gate on voltage Von is applied to all the image scanning lines G1 to G(2n) in sequence and the image data signal is applied to all the pixels PX to display an image of one frame.

Referring to FIGS. 3 and 6, the sense signal processor 800 reads the sense data signals that flow on the sense data lines SX1 to SXn and SY1 to SYm. The sense signal processor 800 may read the sense data signal in a porch section between frames once every frame, and the reading operation may be performed once every plural frames as necessary.

In addition, the sense signal processor 800 performs the signal processing such as the amplifying and filtering of the read analog sense data signal and thereafter, converts the signal-processed analog sense data signal into the digital sense signal DSN and sends out the converted digital sense signal DSN to the touch determinator 700.

The touch determinator 700 receives the digital sense signal DSN and properly computes the received digital sense signal to find the touch or not and the touch location and transmit them to the external apparatus. The external apparatus may transmit the image signal based on them to the display device.

Hereinafter, referring to FIGS. 8 to 21 in addition to the above-mentioned figures, the plurality of pixels PX, the display signal lines and the sense signal lines, and the sensing units of the display device according to the invention will be described in more detail. Like elements described in the exemplary embodiment refer to like reference numerals. The same description will be omitted.

FIGS. 8 to 21 are diagrams illustrating plan views of exemplary embodiments of an arrangement of pixels and various signal lines of a display device, according to the invention. Herein, the image data lines D1 to Dm described above are represented by reference numeral DL, the image scanning lines G1 to G(2n) of FIG. 1 and G1 to G(3n) of FIG. 2 are represented by reference numeral GL, the horizontal sense data lines SX1 to SXn are represented by reference numeral SXL, and the vertical sense data lines SY1 to SYm are represented by reference numeral SYL.

Figure 8:
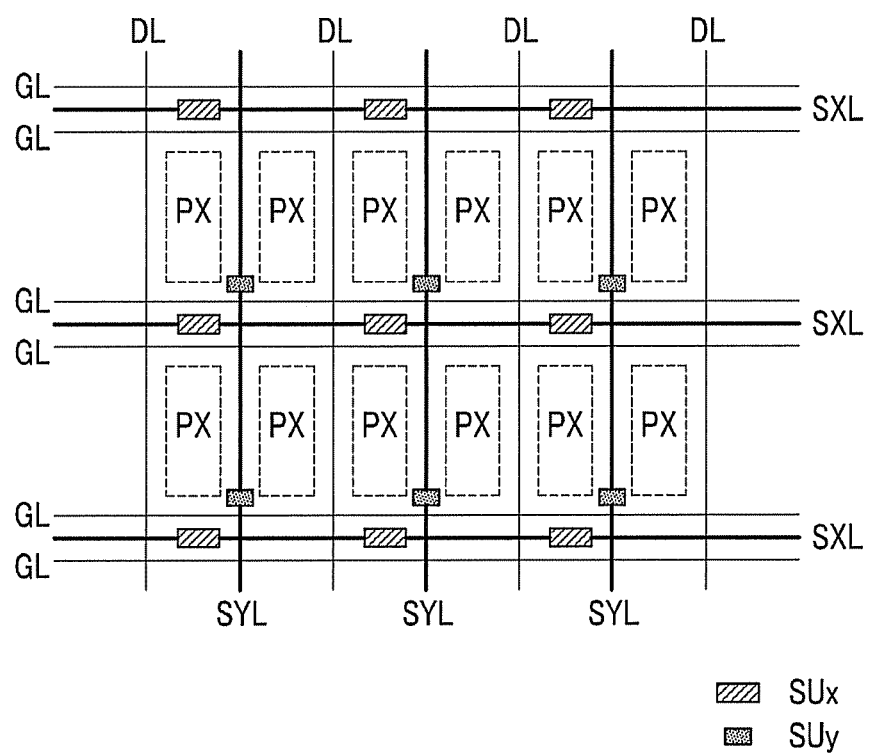
FIGS. 8 to 21 are plan views of exemplary embodiments of configurations of pixels and various signal lines of a display device, according to the invention.

Referring to FIG. 8, one image data line DL is arranged in every two pixel columns as described in FIG. 1, such that two pixel columns are between adjacent image data lines DL, and a pair of image scanning lines GL are adjacent to each other above and below of each pixel row.

Each of the horizontal sense data lines SXL is disposed in every pixel row and may be positioned between two adjacent image scanning lines GL. The vertical sense data lines SYL are positioned between two adjacent pixels PX, in particular, may be positioned between two pixel columns where the image data lines DL are not disposed. Therefore, the image data lines DL and the vertical sense data lines SYL may be alternately arranged.

One first sensing unit SUx connected to one horizontal sense data line SXL may be disposed in every two pixel columns (e.g., every other pixel column), and one second sensing unit SUy connected to one vertical sense data line SYL may be disposed in every pixel row. In one exemplary embodiment, for example, as shown in FIG. 8, one first sensing unit SUx and one second sensing unit SUy may be disposed in every intersecting points of the horizontal sense data lines SXL and the vertical sense data lines SYL.

Figure 9:
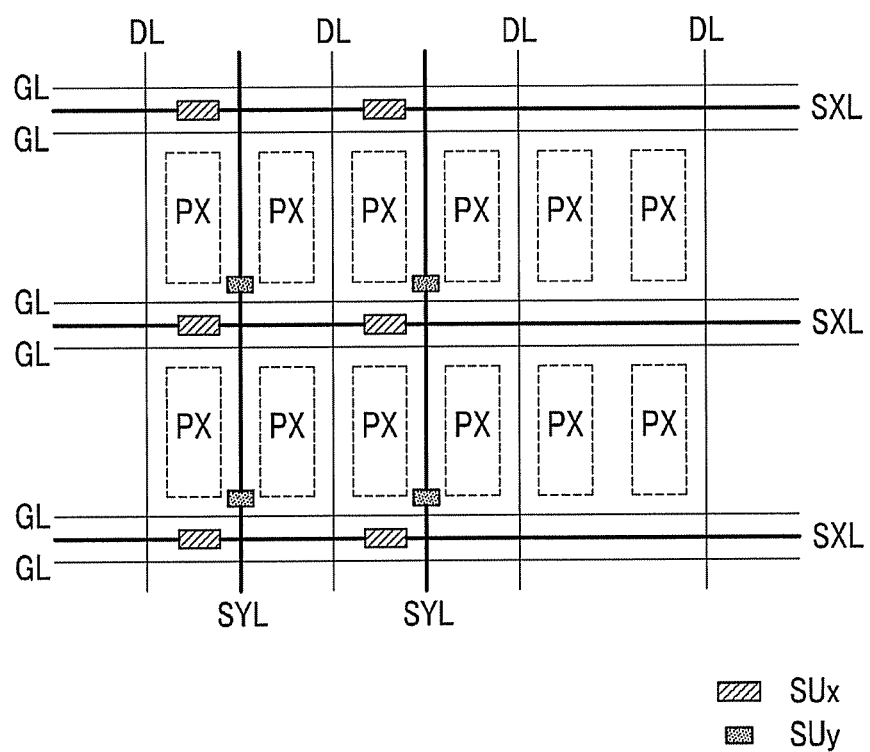

The exemplary embodiment shown in FIG. 9 is generally the same as the exemplary embodiment shown in FIG. 8. However, the vertical sense data lines SYL are positioned between two pixels PX where the image data lines DL are not disposed, but they are omitted in some regions. In one exemplary embodiment, for example, as shown in FIG. 9, two vertical sense data lines SYL may be arranged relative to every six pixel columns, such that the vertical sense lines SYL are in a one-to-three correspondence with the pixel columns. The group of six pixel columns are consecutively arranged in the display device.

One first sensing unit SUx connected to one horizontal sense data line SXL is also disposed in every two pixel columns (e.g., every other pixel row for a first portion of the pixel columns in the display device, but first sensing units Sux are omitted in a second portion of the pixel columns excluding the first portion. In one exemplary embodiment, for example, as shown in FIG. 9, two first sensing units SUx may be arranged relative to every six pixel columns.

One second sensing unit SUy connected to one vertical sense data line SYL may be disposed in every pixel row in the first portion of pixel columns in the display device, as shown in FIG. 9. That is, as shown in FIG. 9, one first sensing unit SUx and one second sensing unit SUy may be disposed in every intersecting points of the horizontal sense data lines SXL and the vertical sense data lines SYL within the first portion of the pixel columns in the display device. Where first sensing units Sux are omitted in a second portion excluding the first portion of the pixel columns within the display device, the second sensing unit Suy are also omitted in the second portion.

Figure 10:
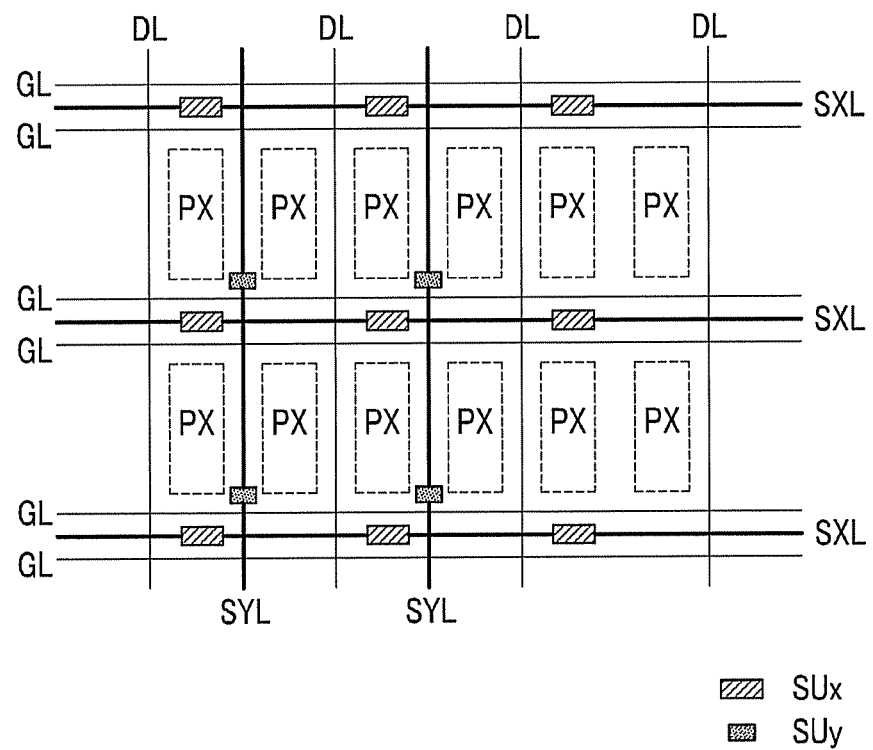

The exemplary embodiment shown in FIG. 10 is generally the same as the exemplary embodiment shown in FIG. 9. However, one first sensing unit SUx connected to one horizontal sense data line SXL may be disposed in every two pixel columns (e.g., every other pixel row for all portions of the pixel columns) in the same manner as the exemplary embodiment shown in FIG. 8. Therefore, as shown in FIG. 10, the first sensing unit SUx may be disposed even in pixel columns that do not interpose the vertical sense data line SYL in a second portion of the pixel columns in addition to the intersecting points of the horizontal sense data lines SXL and the vertical sense data lines SYL in a first portion of the pixel columns.

Figure 11:
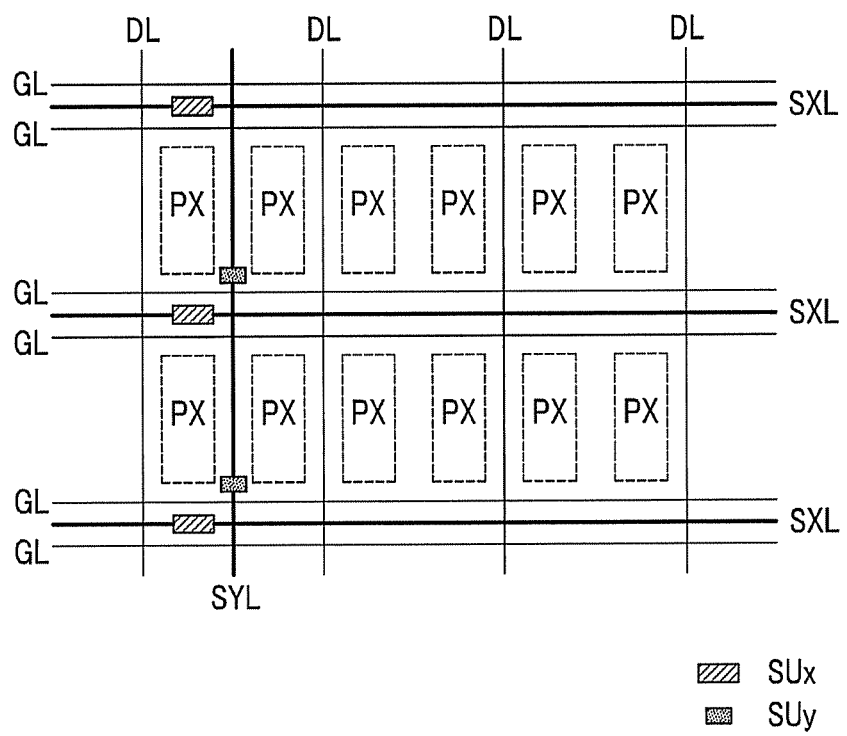

The exemplary embodiment shown in FIG. 11 is generally the same as the exemplary embodiment shown in FIG. 8. However, the vertical sense data lines SYL are positioned in a first portion of the pixel columns between two pixel columns where the image data line DL is not disposed, but the vertical sense data lines SYL are omitted in a second portion of the pixel columns excluding the first portion. In one exemplary embodiment, for example, as shown in FIG. 11, one vertical sense data line SYL may be disposed relative to every six pixel columns.

One first sensing unit SUx connected to one horizontal sense data line SXL may also be disposed relative to every six pixel columns. One second sensing unit SUy connected to one vertical sense data line SYL may be disposed in every pixel row in the first portion of the pixel columns. Therefore, as shown in FIG. 11, one first sensing unit SUx and one second sensing unit SUy may be disposed in every intersecting points of the horizontal sense data lines SXL and the vertical sense data lines SYL.

Figure 12:
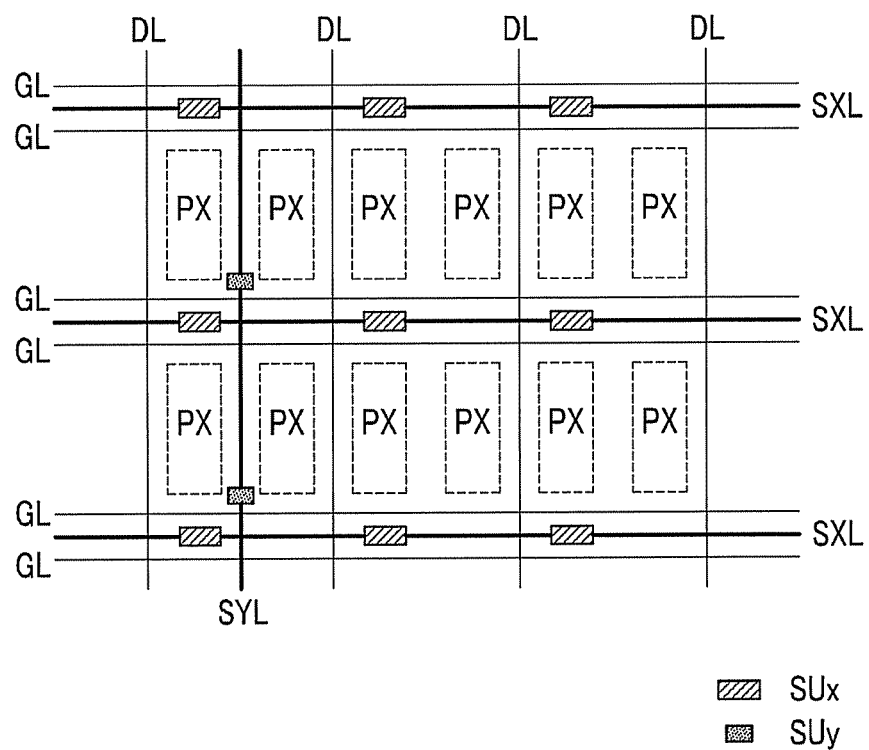

The exemplary embodiment shown in FIG. 12 is generally the same as the exemplary embodiment shown in FIG. 11. However, one first sensing unit SUx connected to one horizontal sense data line SXL may be disposed in every two pixel columns (e.g., every other pixel row for all portions of the pixel columns) in the same manner as the exemplary embodiment shown in FIG. 8. Therefore, as shown in FIG. 11, the first sensing unit SUx may be disposed even in pixel columns that do not interpose the vertical sense data line SYL in a second portion of the pixels columns, in addition to the intersecting points of the horizontal sense data lines SXL and the vertical sense data lines SYL in a first portion of the pixel columns. In an alternative embodiment, two first sensing units SUx may be disposed relative to every six pixel columns.

In various methods in addition to the exemplary embodiments shown in FIGS. 8 to 12, the sense data lines SXL and SYL and the sensing units SUx and SUy may be arranged.

Next, referring to FIG. 13, one image data line DL is disposed in every three pixel columns as described in FIG. 2, such that three pixel columns are between adjacent image data lines DL, and three image scanning lines GL are adjacent to each other above and below of each pixel row.

Each of the horizontal sense data lines SXL is disposed in every pixel row and may be positioned between two adjacent image scanning lines GL. In one exemplary embodiment, for example, the horizontal sense data line SXL may be positioned between the image scanning line GL connected to an upper pixel row and the image scanning line GL connected to a lower pixel row between two neighboring pixel rows.

The vertical sense data line SYL is positioned between two adjacent pixels PX, in particular, may be positioned between two pixel columns where the image data line DL is not disposed. That is, two vertical sense data lines SYL may be positioned relative to every three pixel columns that are positioned between two neighboring image data lines DL. Therefore, one image data line DL and two vertical sense data lines SYL may be alternately arranged in a group of three pixel columns.

Two first sensing units SUx connected to one horizontal sense data line SXL may be disposed relative to every three pixel columns, and one second sensing unit SUy connected to one vertical sense data line SYL may be disposed relative to every pixel row. In one exemplary embodiment, for example, as shown in FIG. 13, one first sensing unit SUx and one second sensing unit SUy may be disposed in every intersecting points of the horizontal sense data lines SXL and the vertical sense data lines SYL.

Figure 13:
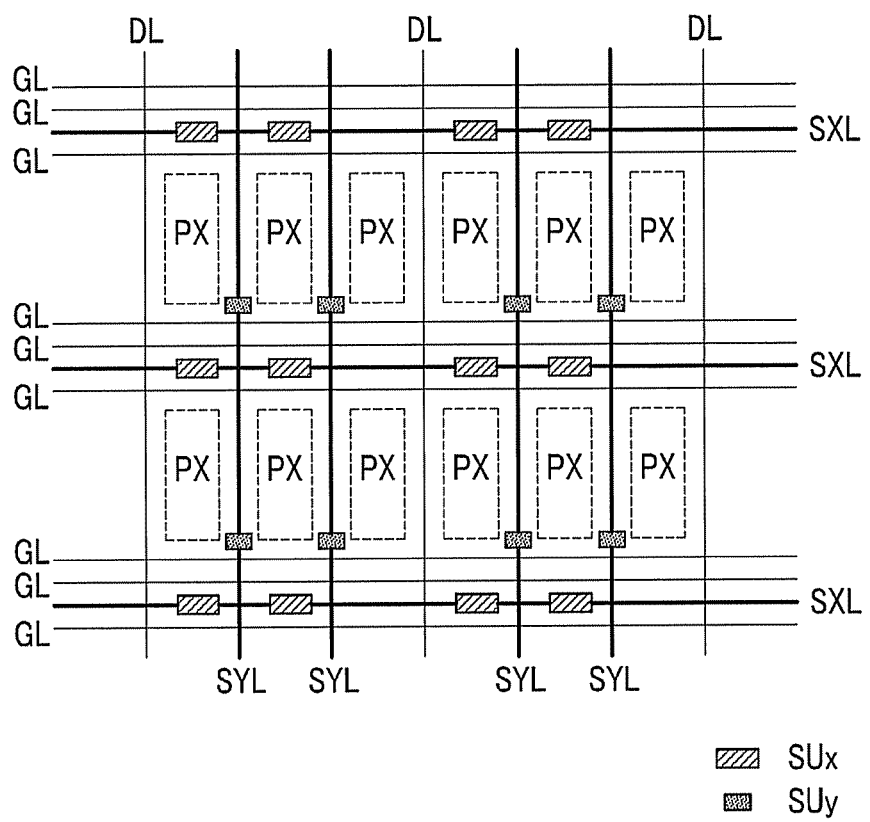
Figure 14:
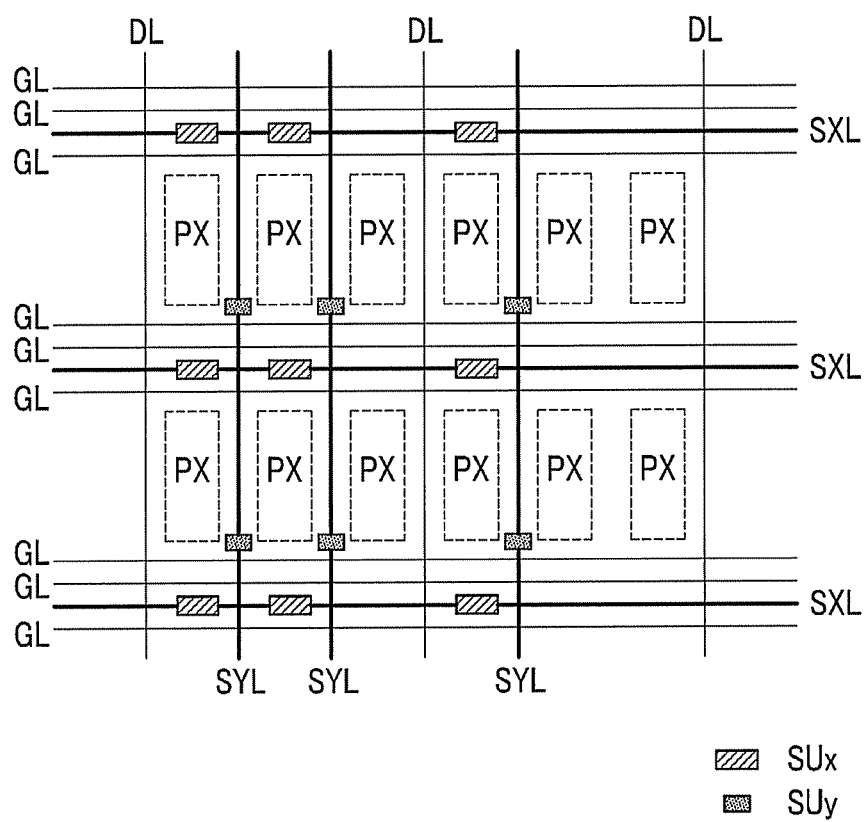

The exemplary embodiment shown in FIG. 14 is generally the same as the exemplary embodiment shown in FIG. 13. However, the vertical sense data line SYL is positioned between two pixel columns where the image data lines DL are not disposed, but the vertical sense data lines SYL are omitted in some regions of the display device. In one exemplary embodiment, for example, as shown in FIG. 14, three vertical sense data lines SYL may be arranged relative to every six pixel columns.

One first sensing unit SUx connected to one horizontal sense data line SXL is also disposed relative to every group of three pixel columns, but the sensing unit SUx is omitted in a portion of some groups of three pixel columns. In one exemplary embodiment, for example, as shown in FIG. 14, three first sensing units SUx may be arranged relative to every six pixel columns. One second sensing unit SUy connected to one vertical sense data line SYL may be disposed in every pixel row in the same manner as shown in FIG. 13. Therefore, as shown in FIG. 14, one first sensing unit SUx and one second sensing unit SUy may be disposed in every intersecting points of the horizontal sense data lines SXL and the vertical sense data lines SYL.

Figure 15:
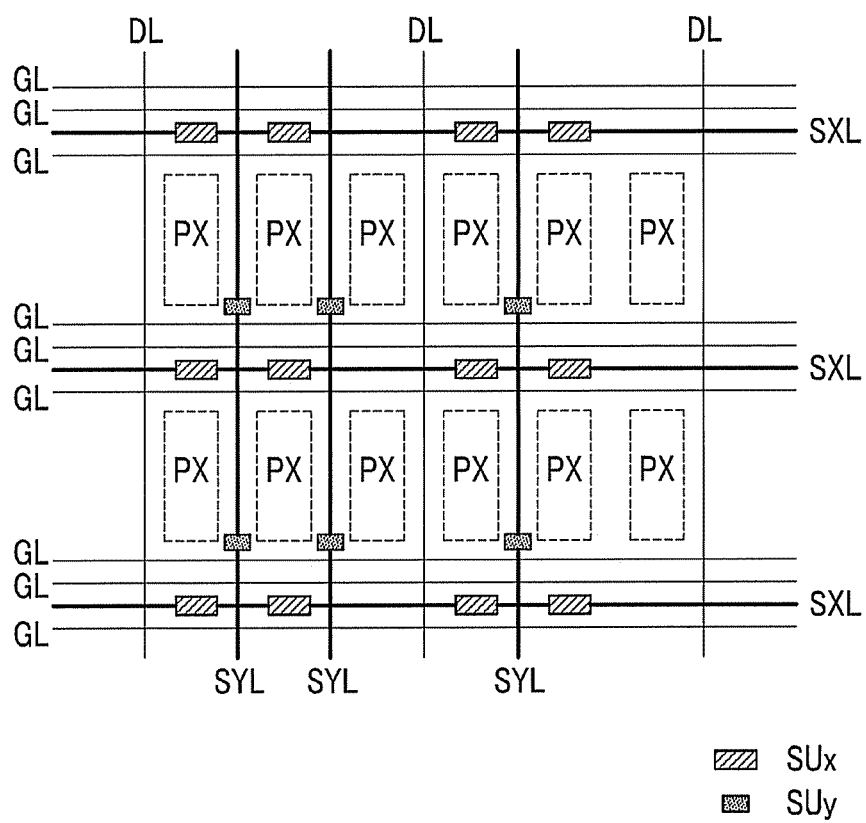

The exemplary embodiment shown in FIG. 15 is generally the same as the exemplary embodiment shown in FIG. 14. However, two first sensing units SUx connected to one horizontal sense data line SXL may be disposed relative to every three pixel columns in the same manner as the exemplary embodiment shown in FIG. 13. Therefore, as shown in FIG. 15, the first sensing unit SUx may be disposed even in pixel columns that do not interpose the vertical sense data line SYL, in addition to the intersecting points of the horizontal sense data lines SXL and the vertical sense data lines SYL.

Figure 16:
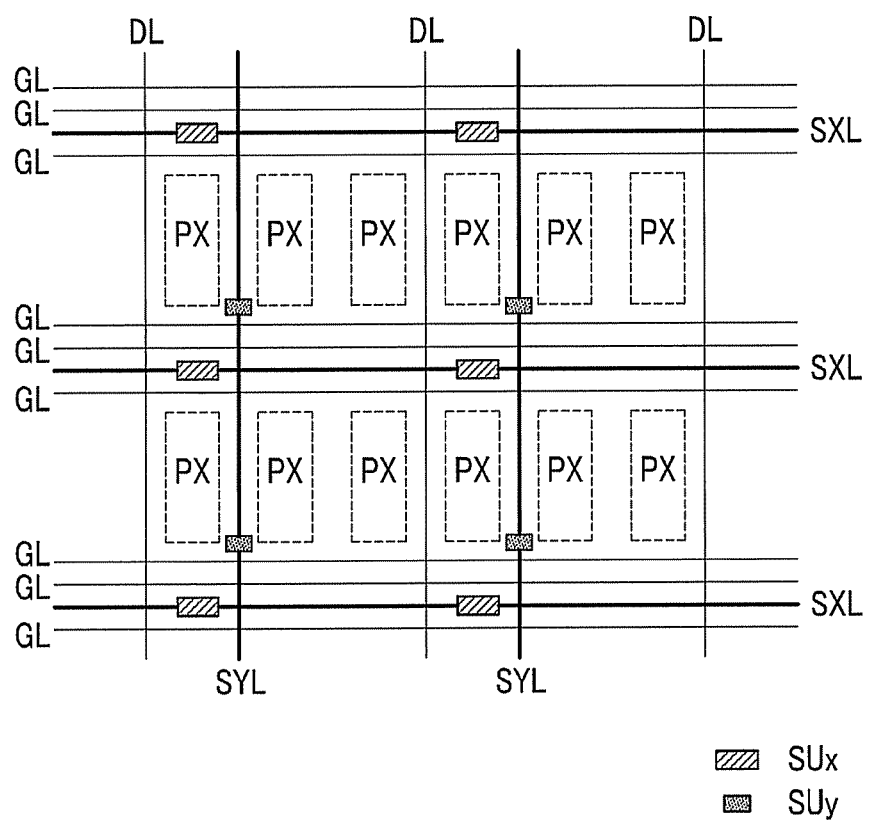

The exemplary embodiment shown in FIG. 16 is generally the same as the exemplary embodiment shown in FIG. 13. However, the vertical sense data line SYL is positioned between two pixel columns where the image data lines DL are not disposed, but the vertical sense data lines SYL are omitted in some regions. In one exemplary embodiment, for example, as shown in FIG. 16, two vertical sense data lines SYL may be arranged relative to every six pixel columns, or one vertical sense data line SYL may be arranged relative to every three pixel columns.

Two first sensing units SUx or one first sensing unit SUx connected to one horizontal sense data line SXL may also be disposed relative to every six pixel columns or every three pixel columns, respectively. One second sensing unit SUy connected to one vertical sense data line SYL may be disposed in every pixel row in the same manner as FIG. 13. Therefore, as shown in FIG. 16, one first sensing unit SUx and one second sensing unit SUy may be disposed in every intersecting point of the horizontal sense data lines SXL and the vertical sense data lines SYL.

Figure 17:
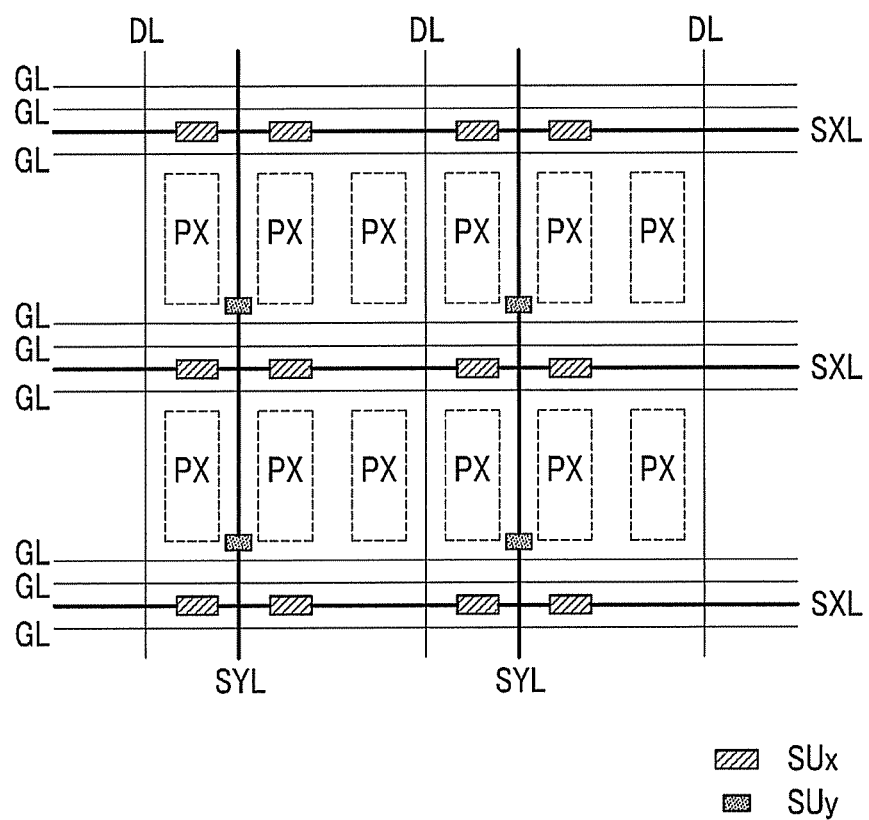

The exemplary embodiment shown in FIG. 17 is generally the same as the exemplary embodiment shown in FIG. 16. However, four first sensing units SUx or two first sensing units SUx connected to one horizontal sense data line SXL may be arranged relative to every six pixel columns or every three pixel columns, respectively. Therefore, as shown in FIG. 17, the first sensing unit SUx may be disposed even in pixel columns that do not interpose the vertical sense data line SYL, in addition to the intersecting points of the horizontal sense data lines SXL and the vertical sense data lines SYL. In an alternative embodiment, three or five sensing units SUx may be arranged relative to every six pixel columns.

Figure 18:
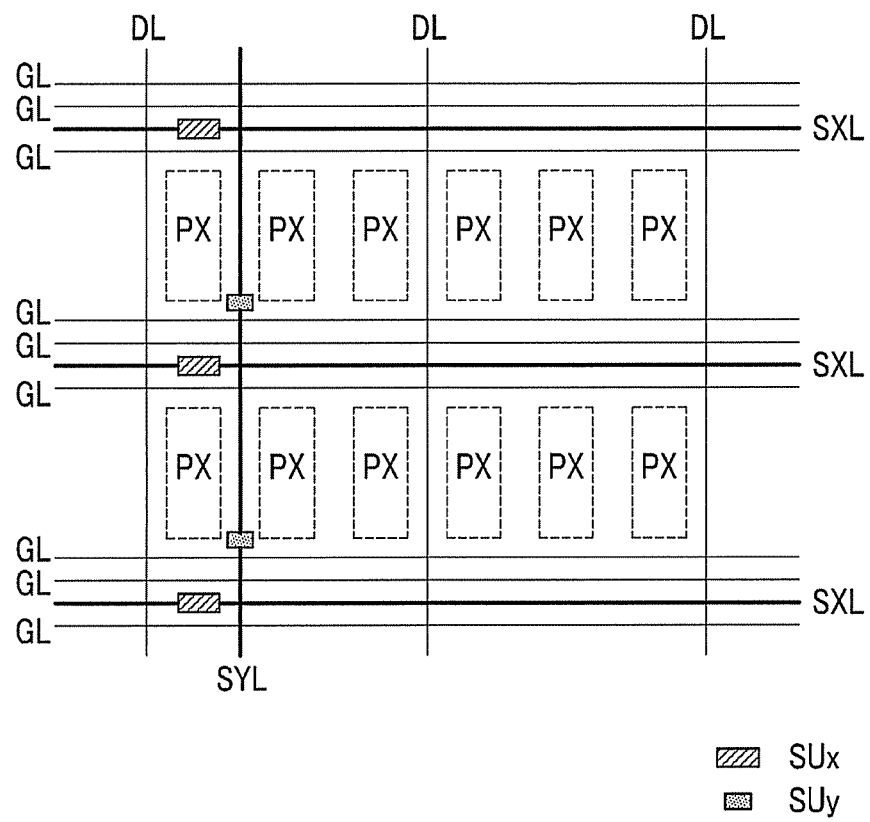

The exemplary embodiment shown in FIG. 18 is generally the same as the exemplary embodiment shown in FIG. 13. However, the vertical sense data line SYL is positioned between two pixel columns where the image data lines DL are not disposed, but the vertical sense data lines SYL are omitted in some regions. In one exemplary embodiment, for example, as shown in FIG. 18, one vertical sense data line SYL may be disposed relative to every six pixel columns.

One first sensing unit SUx connected to one horizontal sense data line SXL may be disposed relative to every six pixel columns. One second sensing unit SUy connected to one vertical sense data line SYL may be disposed in every pixel row in the same manner as FIG. 13. Therefore, as shown in FIG. 18, one first sensing unit SUx and one second sensing unit SUy may be disposed in every intersecting points of the horizontal sense data lines SXL and the vertical sense data lines SYL.

Figure 19:
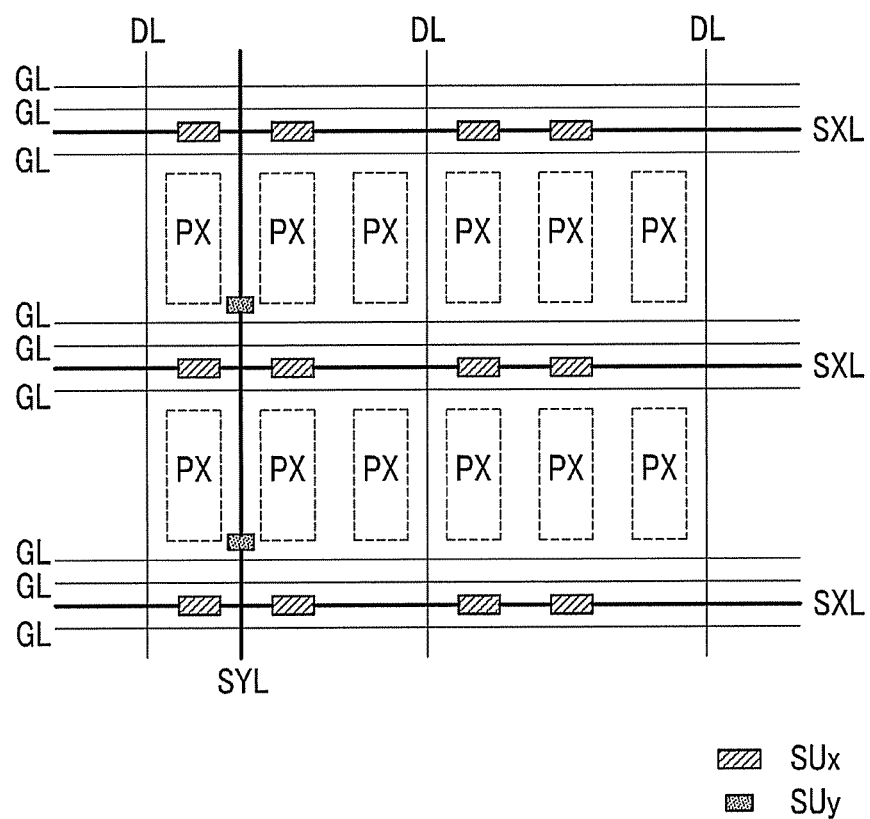

The exemplary embodiment shown in FIG. 19 is generally the same as the exemplary embodiment shown in FIG. 18. However, four first sensing units SUx or two first sensing units SUx connected to one horizontal sense data line SXL may be arranged relative to every six pixel columns or every three pixel columns, respectively. Therefore, as shown in FIG. 19, the first sensing unit SUx may be disposed even in pixel columns that do not interpose the vertical sense data line SYL, in addition to the intersecting points of the horizontal sense data lines SXL and the vertical sense data lines SYL. In an alternative embodiment, three or five first sensing units SUx may be disposed relative to every six pixel columns.

In various methods in addition to the exemplary embodiments shown in FIGS. 13 to 19, the sense data lines SXL and SYL and the sensing units SUx and SUy may be arranged.

Figure 20:
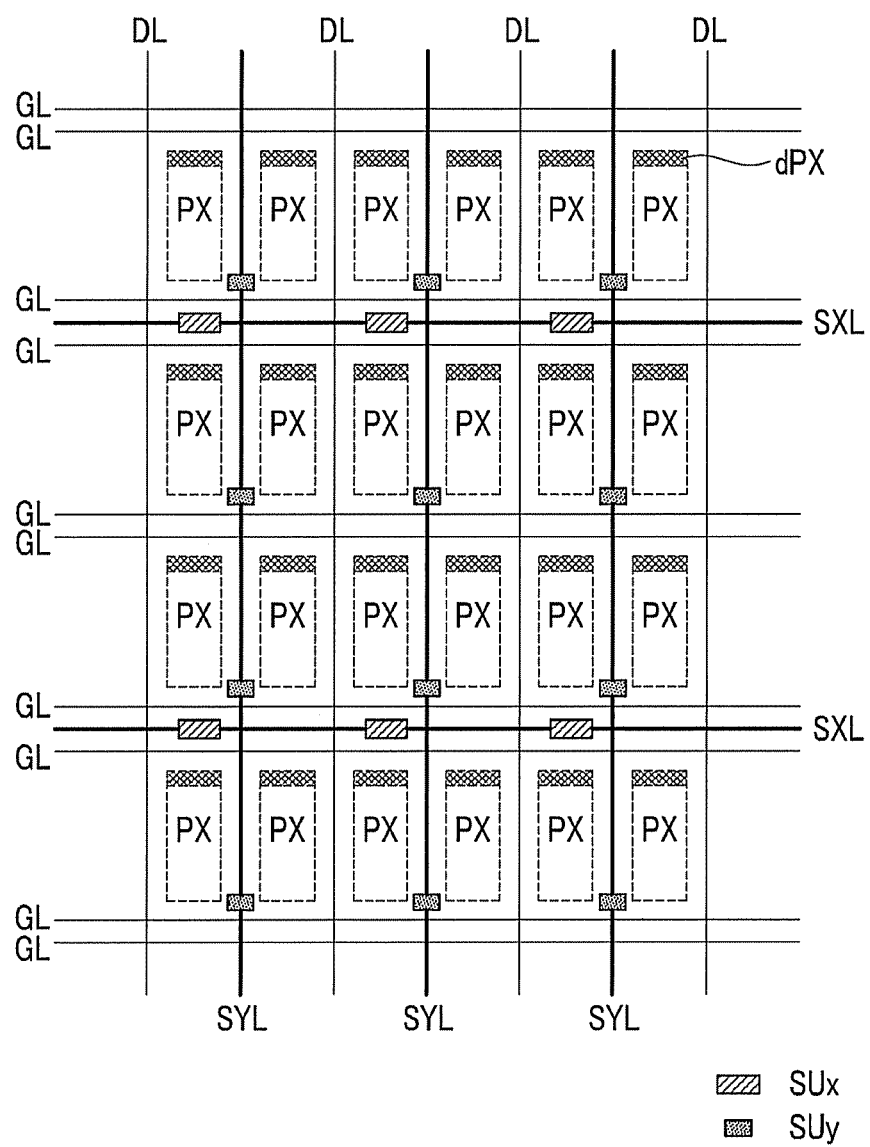

Referring to FIG. 20, the exemplary embodiment is generally the same as the exemplary embodiment shown in FIG. 8, but the horizontal sense data line SXL is not positioned on all adjacent image scanning lines GL, and the horizontal sense data line SXL is omitted in some regions of the display device. That is, one horizontal sense data line SXL may be disposed relative to every two or more pixel rows. Therefore, an aperture ratio of each pixel PX may be increased by an increment amount dPX of each pixel in comparison with the exemplary embodiment shown in FIG. 8.

Figure 21:
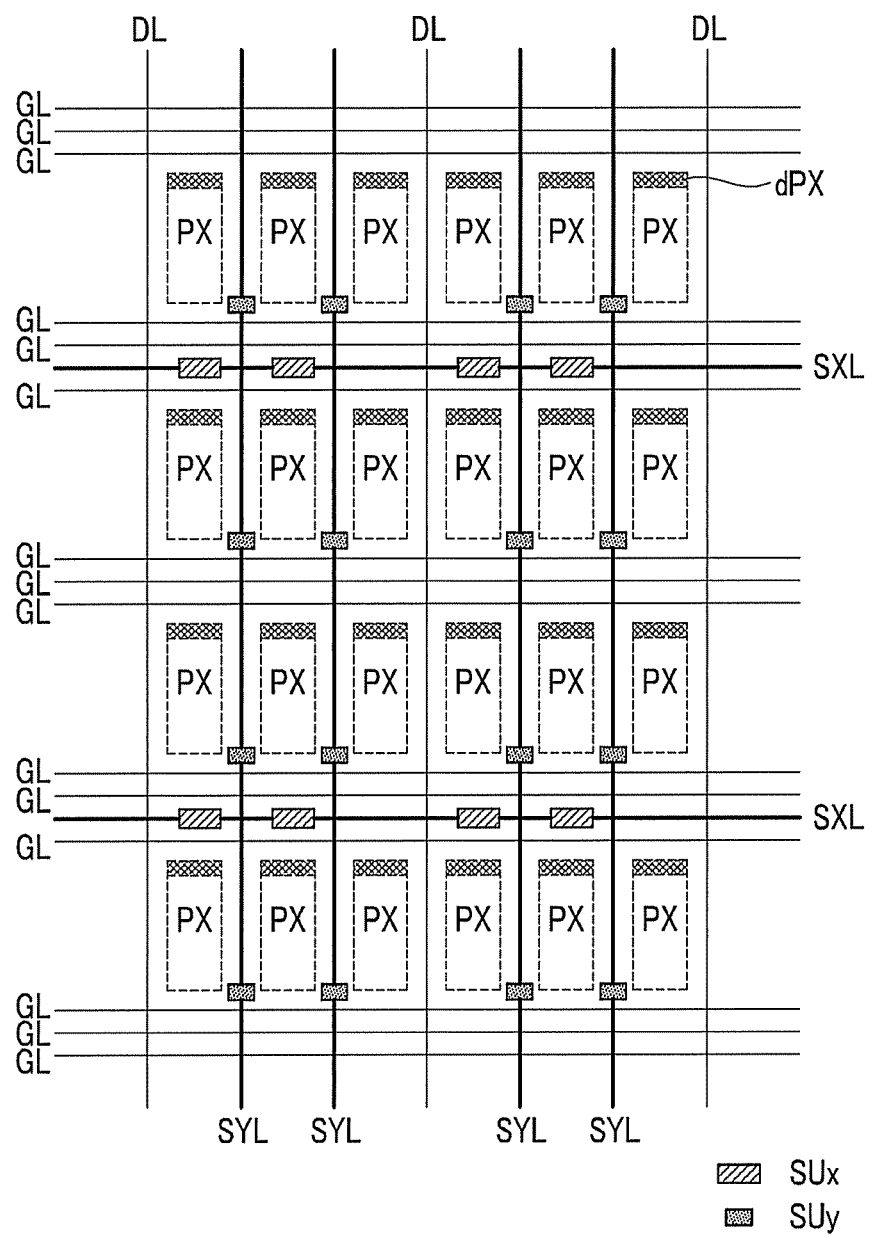

Referring to FIG. 21, the exemplary embodiment is generally the same as the exemplary embodiment shown in FIG. 13, but the horizontal sense data line SXL is not positioned on all adjacent image scanning lines GL, and the horizontal sense data line SLX is omitted in some regions of the display device. That is, one horizontal sense data line SXL may be disposed relative to every two or more pixel rows. Therefore, an aperture ratio of each pixel PX may be increased by an increment amount dPX in comparison with the exemplary embodiment shown in FIG. 13.

In the exemplary embodiments shown in FIGS. 8 to 21, exemplary embodiments including the first sensing unit SUx and the second sensing unit SUy are described relative to FIG. 3, where one individual sensing unit SU is connected only to a horizontal sense data line SX or a vertical sense data line SY, but not both. However, in the exemplary embodiments shown in FIGS. 8, 9, 13, 14, 16, 18, 20, and 21, an individual one sensing unit SU of FIG. 6 may be positioned instead of a pair of neighboring first sensing unit SUx and second sensing unit Suy, such that the individual one sensing unit SU is connected both to exactly one of the horizontal sense data lines SX1 to SXn, and exactly one of the vertical sense data lines SY1 to SYm.

Further, in the exemplary embodiments shown in FIGS. 8 to 21, the first sensing unit SUx and the second sensing unit SUy are adjacent to each other in most portions of the display device, but positions of the first sensing unit SUx and the second sensing unit SUy are not limited thereto. In alternative embodiments, the first sensing unit SUx and the second sensing unit SUy are not adjacent to each other, and may be spaced from each other by an interval in a horizontal (e.g., row) side direction or a vertical (e.g., column) side directly of the pixel PX.

Hereinafter, referring to FIGS. 22 to 24, an exemplary embodiment of a display panel of a display device according to the invention will be described.

Figure 22:
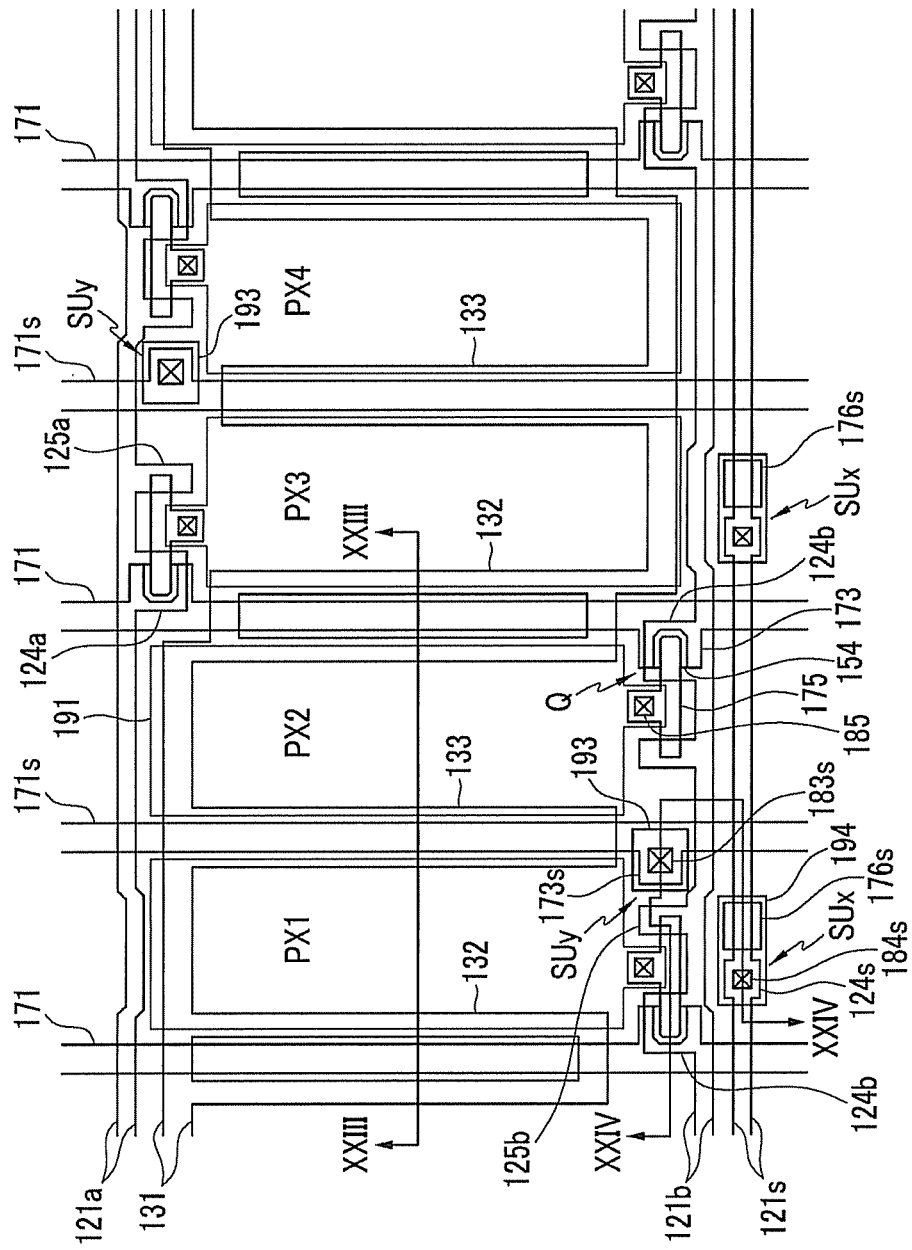
FIG. 22 is a plan view of an exemplary embodiment of a display panel of a display device, according to the invention.
Figure 23:
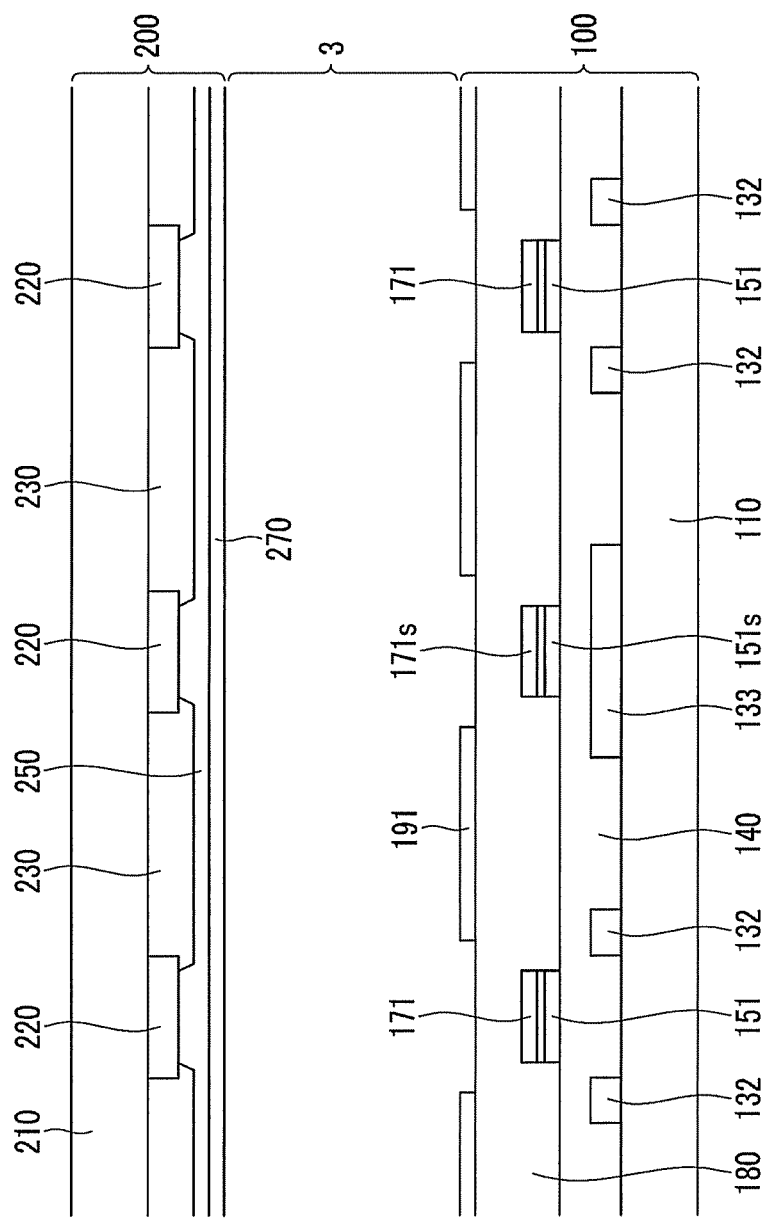
FIG. 23 is a cross-sectional view of the display panel taken along line XXIII-XXIII of FIG. 22.
Figure 24:
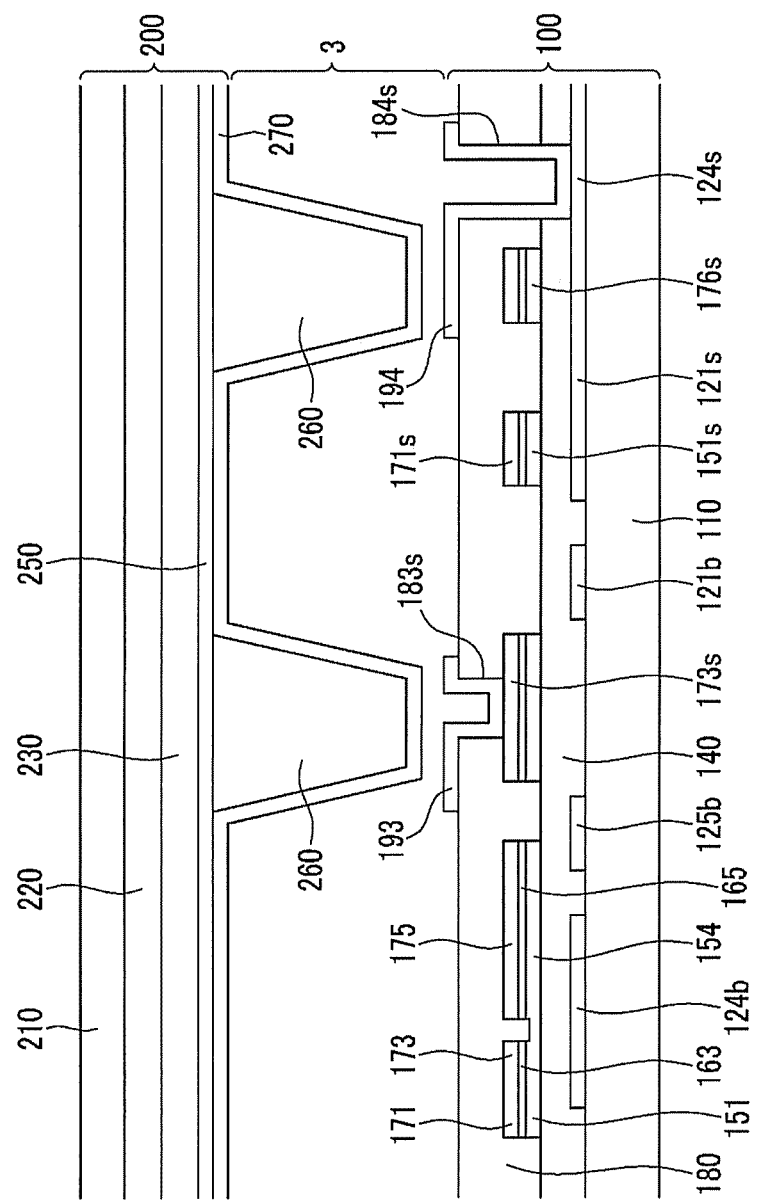
FIG. 24 is a cross-sectional view of the display panel taken along line XXIV-XXIV of FIG. 22.

FIG. 22 is a plan view of a display panel of a display device, according to the invention, FIG. 23 is a cross-sectional view of the display panel taken along line XXIII-XXIII of FIG. 22, and FIG. 24 is a cross-sectional view of a display panel taken along line XXIV-XXIV of FIG. 22.

The display panel of the display device is a display panel of the liquid crystal display, but the invention may be applied to various display devices in addition to the liquid crystal display.

The display panel of the liquid crystal display includes a lower display panel 100 and an upper display panel 200 that face each other, and a liquid crystal layer 3 interposed between the two display panels 100 and 200.

First, the upper display panel 200 will be described. A light blocking member 220 and a plurality of a color filter 230 are on an insulating substrate 210. Each of the color filters 230 may display any one of primary colors of red, green, and blue colors. At least one of the color filters 230 and the light blocking member 220 may be on the lower display panel 100.

An overcoat 250 is on the color filters 230 and the light blocking member 220. A plurality of a pillar type protrusion 260 is on the overcoat 250.

An opposed electrode 270 receiving predetermined voltage such as common voltage Vcom, or the like is on the overcoat 250 and the pillar type protrusion 260.

The liquid crystal layer 3 interposed between the lower display panel 100 and the upper display panel 200 may include liquid crystal molecules having dielectric anisotropy. The liquid crystal molecules may be aligned so that their long axes are vertical or horizontal to the surfaces of the two display panels 100 and 200 while no electric field is present. In alternative embodiments, the liquid crystal layer 3 may be aligned in various modes.

Next, the lower display panel 100 will be described.

A plurality of a gate conductor including a plurality of a first gate line 121a, a plurality of a second gate line 121b, a common voltage line 131, and a plurality of a horizontal sense data line 121s different from the gate lines 121a and 121b are on the insulating substrate 110. The first gate lines 121a and the second gate lines 121b correspond to the image scanning lines GL described in the above exemplary embodiments.

The first gate lines 121a and the second gate lines 121b transfer the image scanning signals, generally extend in a first (e.g., horizontal) direction are alternately arranged in a second (e.g., column) direction. The first gate line 121a, and the second gate line 121b positioned below the first gate line 121a form a pair of gate lines. Considering an adjacent pair of gate lines, the first gate line 121a of a first pair of the adjacent gate lines may be positioned closer to the second gate line 121b of a second pair of the adjacent gate lines positioned above the first pair of gate lines.

The first gate line 121a includes a plurality of a first gate electrode 124a and a plurality of a first auxiliary gate electrode 125a that protrudes downwards from a main portion of the first gate line 121a in the plan view. The first auxiliary gate electrode 125a may be adjacent to the left or right of the first gate electrode 124a. The first gate electrode 124a and the first auxiliary electrode 125a, along with the main portion of the first gate line 121a form a single unitary indivisible member of the first gate line 121a.

The second gate line 121b includes a plurality of a second gate electrode 124b and a plurality of a second auxiliary gate electrode 125b that protrudes upwards from a main portion of the second gate line 121b in the plan view. The second auxiliary gate electrode 125b may be adjacent to the left or right of the second gate electrode 124b. The second gate electrode 124b and the second auxiliary electrode 125b, along with the main portion of the second gate line 121b form a single unitary indivisible member of the second gate line 121b.

The common voltage line 131 may extend substantially parallel to the first and second gate lines 121a and 121b generally in the first horizontal direction, and includes a ring-type protrusion 132 extending downwards and/or upwards, and a pillar-type protrusion 133 extending downwards and/or upwards. The ring-type protrusion 132 and the pillar-type protrusion 133 may be alternately arranged in a row direction. The ring-type protrusion 132 and the pillar-type protrusion 133, along with a main portion of the common voltage line 131 collectively form a single unitary indivisible member of the common voltage line 131.

The horizontal sense data lines 121s may be positioned between the second gate line 121b of a first pair of gate lines, and the first gate line 121a of an adjacent pair of gate lines below the second gate line 121b in the plan view. The horizontal sense data line 121s may extend substantially parallel to the first and second gate lines 121a and 121b generally in the first horizontal direction and includes a plurality of an extension 124s.

A gate insulating layer 140, which may be made of silicon nitride (SiNx) or silicon oxide (SiOx), is directly on the gate conductors.

A plurality of a first linear semiconductor 151 and a plurality of a second linear semiconductor 151s, which may be made of hydrogenated amorphous silicon (amorphous silicon is abbreviated to a-Si) or polysilicon, are directly on the gate insulating layer 140.

The first and second linear semiconductors 151 and 151s are alternately arranged in the row direction in the plan view, and extend generally in the second vertical direction. The first linear semiconductor 151 includes a plurality of a protrusion 154 that each extend toward the first gate electrode 124a or the second gate electrode 124b.

A plurality of ohmic contacts 163 and 165 are on each of the first and second linear semiconductors 151 and 151s. The ohmic contact 163 and the ohmic contact 165 form a pair while facing each other with respect to the first gate electrode 124a and or the second gate electrode 124b, respectively. Facing parts of the ohmic contacts 163 and the 165 are disposed on and overlapping the protrusion 154 of the first linear semiconductor 151.

A data conductor including a plurality of a data line 171, a plurality of a vertical sense data line 171s, a plurality of a drain electrode 175, and a plurality of an auxiliary electrode 176s is on the ohmic contacts 163 and 165. The data lines 171 correspond to the image data lines DL in the exemplary embodiments.

The data lines 171 transfer image data signals, and cross the first and second gate lines 121a and 121b in the plan view, while extending generally in the second vertical direction. Each of the data lines 171 includes a plurality of a source electrode 173 that extends toward the first gate electrode 124a or the second gate electrode 124b. The source electrode 173 together with a main portion of the data line 171 forms a single unitary indivisible data line 171.

The drain electrode 175 includes a first end portion facing the source electrode 173, and a second end portion which is partially overlapped with the first auxiliary gate electrode 125a or the second auxiliary gate electrode 125b. The first auxiliary gate electrode 125a and the drain electrode 175, and the second auxiliary gate electrode 125b and the drain electrode 175 are partially overlapped with each other in order to maintain parasitic capacitance between the drain electrode 175 and the gate conductor constantly, even though the location of the drain electrode 175 extends horizontally. The first and second auxiliary gate electrodes 125a and 125b may be omitted in order to improve an aperture ratio.

The vertical sense data lines 171s are arranged alternately with the data lines 171 in the row direction, and cross the first and second gate lines 121a and 121b while extending substantially parallel to the data lines 171 generally in the second vertical direction. The vertical sense data lines 171s include a plurality of an extension 173s.

The auxiliary electrodes 176s may be positioned adjacent to the right of the extensions 124s of the horizontal sense data lines 121s in the plan view, but an auxiliary electrode 176s may be omitted.

The ring-type protrusion 132 of the common voltage line 131 includes a pair of vertical sections, and at least one horizontal section parallel with the main section.

The pair of vertical sections are positioned at both of right and left sides of each data line 171, and the horizontal section crosses the data line 171 in the plan view.

Further, the pillar-type protrusion 133 of the common voltage line 131 is overlapped with the vertical sense data line 171s. In particular, as shown in FIGS. 22 and 23, a horizontal width of the pillar-type protrusion 133 is larger than a horizontal width of the vertical sense data line 171s, such that a boundary of the vertical sense data line 171s is positioned inside of a boundary of the pillar-type protrusion 133 on the basis of the horizontal direction, in the plan view. Therefore, the pillar-type protrusion 133 and the vertical sense data line 171s may completely be overlapped with each other. That is, an entire of a width of the vertical sense data line 171s is overlapped by the pillar-type protrusion 133. The ring-type protrusion 132 and the pillar-type protrusion 133 of the common voltage line 131 may reduce or effectively prevent light from being leaked around the data line 171 and the vertical sense data line 171s, respectively.

The first gate electrode 124a the source electrode 173 and the drain electrode 175, or the second gate electrode 124b, the source electrode 173 and the drain electrode 175 form the thin film transistor ("TFT") (Q) together with the protrusion 154 of the first linear semiconductor 151. A channel of the thin film transistor Q is on the protrusion 154 of the first linear semiconductor 151 between the source electrode 173 and the drain electrode 175.

The ohmic contacts 163 and 165 are provided only between the first and second linear semiconductors 151 and 151s which are below the ohmic contacts 163 and 165, and the data conductors which are above the ohmic contacts 163 and 165, and may decrease contact resistance therebetween.

In an alternative embodiment, unlike the exemplary embodiment in FIGS. 22-24, only an island-type semiconductor (not shown) positioned only on the first gate electrode 124a or the second gate electrode 124b instead of the first and second linear semiconductors 151 and 151s. In this case, the ohmic contacts 163 and 165 may be provided only between the island-type semiconductor, and the source electrode 173 and the drain electrode 175 as data conductors, respectively.

A passivation layer 180 is directly on the data conductors and an exposed portion of the exposed protrusion 154 of the first linear semiconductor 151.

A contact hole 185 for exposing a part of the drain electrode 175, and a contact hole 183s for exposing a part of the extension 173s of the vertical sense data line 171s are extended completely through the passivation layer 180. A contact hole 184s for exposing a part of the extension 124s of the horizontal sense data line 121s is extended completely through both the passivation layer 180 and the gate insulating layer 140.

A plurality of a pixel electrode 191 and a plurality of contact assistants 193 and 194 are directly on the passivation layer 180. The pixel electrodes 191 and the contact assistants 193 and 194 may include a transparent conductive material such as indium tin oxide ("ITO") or indium zinc oxide ("IZO"), or reflective metal such as aluminum, silver, chrome, or an alloy thereof.

The pixel electrodes 191 are physically and electrically connected with the drain electrode 175 through the contact hole 185 to receive the image data signal from the drain electrode 175. The pixel electrode 191 to which data voltage depending on the image data signal is applied, generates the electric field in the liquid crystal layer 3 together with the opposed electrode 270 of the upper display panel 200 to determine the direction of the liquid crystal molecules of the liquid crystal layer 3. Polarization of light passing through the liquid crystal layer 3 depends on the determined direction of the liquid crystal molecules. The pixel electrodes 191 and the opposed electrode 270 form the liquid crystal capacitor together with the liquid crystal layer 3 interposed therebetween, to maintain the applied voltage even after the thin film transistor Q is turned off.

A pixel area is defined as an independent area unit capable of independently controlling the liquid crystal molecules. In one exemplary embodiment such as shown in FIG. 22, pixel areas where the pixel electrodes 191 are positioned are represented by pixels, e.g., PX1, PX1, PX3, and PX4.

The contact assistant 193 is connected with the extension 173s of the vertical sense data line 171s through the contact hole 183s, and the contact assistant 194 is connected with the extension 124s of the horizontal sense data line 121s through the contact hole 184s. Each of the contact assistants 193 and 194 faces the pillar-type protrusion 260 of the upper display panel 200. When pressure, and the like are applied to the display panels 100 and 200 from the outside, the contact assistants 193 and 194 of the lower display panel 100 and the opposed electrodes 270 on the pillar-type protrusions 260 of the upper display panel 200 may contact each other. Therefore, the value of the sense data signal of the horizontal sense data line 121s or the vertical sense data line 171s is changed. It is possible to determine the contact or not on the basis of the changed value.

The extension 124s of the horizontal sense data line 121s, the contact assistant 194 connected with the extension 124s, and the opposed electrode 270 on the pillar-type protrusion 260 of the upper display panel 200 facing the extension 124s and the contact assistant 194 collectively form one first sensing unit SUx together. The extension 173s of the vertical sense data line 171s, the contact assistant 193 connected with the extension 173s, and the opposed electrode 270 on the pillar-type protrusion 260 of the upper display panel 200 facing the extension 173s and the contact assistant 193 collectively form one second sensing unit SUy together.

Referring to FIG. 22, two adjacent pixels PX2 and PX3 share the data line 171 interposed therebetween, and receive the image data signal from the data line 171 shared at different times through different gate lines 121a and 121b, respectively, to display an image. Therefore, the illustrated exemplary embodiment has the same signal line arrangement as the signal line arrangement of the display device shown in FIG. 1. Even when the signal lines are arranged in the same manner as the exemplary embodiment shown in FIG. 2, the invention may have a structure similar to the structure of the display panel shown in FIGS. 22 to 24.

The vertical sense data line 171s is positioned between two pixels where the data line 171 is not disposed, e.g., two pixels PX1 and PX2 or two pixels PX3 and PX4 in FIG. 22, to improve the luminance and aperture ratio of the display device.

In FIG. 22, one first sensing unit SUx and one second sensing unit SUy are adjacent to each other adjacent to an intersecting point where vertical sense data line 171s between two pixels PX1 and PX2 and the horizontal sense data line 121s cross each other.

However, only one first sensing unit SUx is positioned adjacent to an intersecting point where the vertical sense data line 171s between two pixels PX3 and PX4, and one second sensing unit SUy is positioned around the upper first gate line 121a and thus, the first sensing unit SUx and the second sensing unit SUy are not adjacent to each other, but spaced from each other.

Next, referring to FIG. 25, another exemplary embodiment of the display device according to the invention will be described. Like elements described in the exemplary embodiment refer to like reference numerals. The same description will be omitted.

Figure 25:
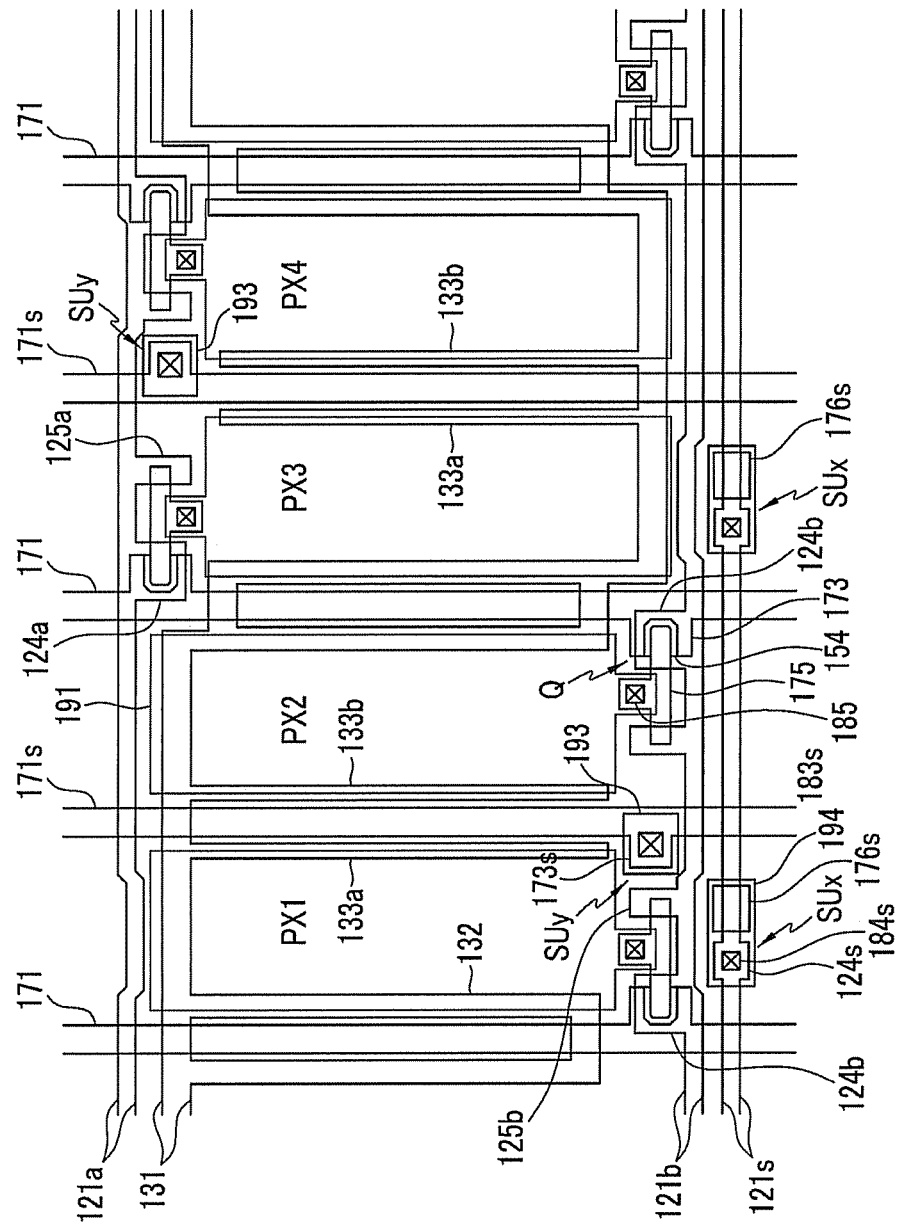
FIGS. 25 and 26 are plan views of alternative exemplary embodiments of a display panel of a display device, according to the invention.

FIG. 25 is a plan view of another exemplary embodiment of the display panel of the display device, according to the invention.

The exemplary embodiment shown in FIG. 25 is generally the same as the exemplary embodiment shown in FIGS. 22 to 24, but is different in the structure of the pillar-type protrusion of the common voltage line 131 of the lower display panel 100. The common voltage line 131 of the illustrated exemplary embodiment includes a plurality of a ring-type protrusion 132, and a plurality of a pair of pillar-type protrusions 133a and 133b. The plurality of pillar-type protrusions 133a and 133b are adjacent to the right and left edges, respectively around the vertical sense data line 171s. As such, the vertical sense data line 171s and the plurality of pair of pillar-type protrusions 133a and 133b are not overlapped with each other so as to reduce or effectively prevent light from being leaked around the vertical sense data line 171s, and prevent signal delay of the vertical sense data line 171s.

Last, referring to FIG. 26, another exemplary embodiment of the display device of the invention will be described. Like elements described in the exemplary embodiment refer to like reference numerals. The same description will be omitted.

Figure 26:
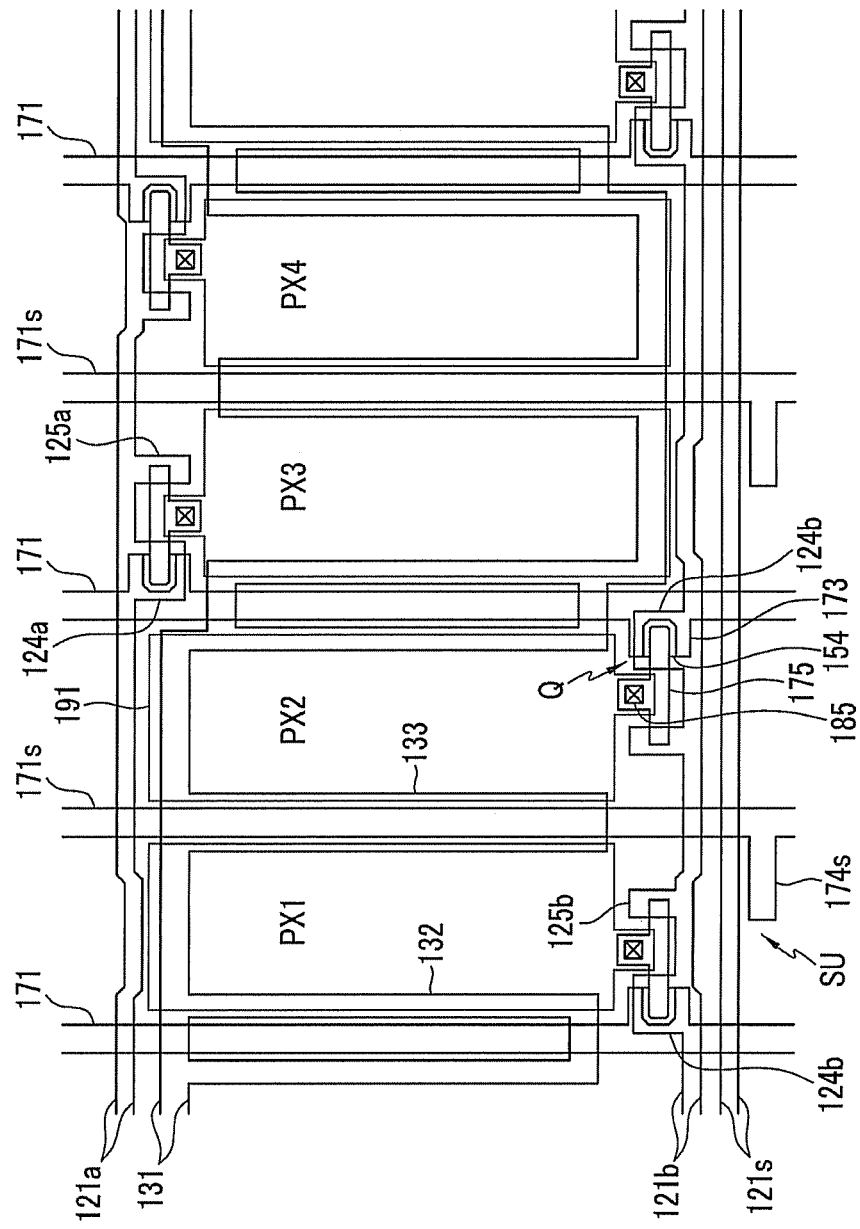

FIG. 26 is a plan view of another exemplary embodiment of the display panel of the display device according to the invention.

The illustrated exemplary embodiment shown in FIG. 26 is generally the same as the exemplary embodiments shown in FIGS. 22 to 24, but includes the sensing unit SU included in the exemplary embodiment of FIG. 6, instead of the first sensing unit SUx and the second sensing unit SUy included in the exemplary embodiment of FIG. 3.

The vertical sense data line 171s includes a plurality of protrusions 174s that protrude in the horizontal direction, and the protrusions 174s form one sensing unit SU together with a part of the horizontal sense data line 121s. In an alternative embodiment, conversely, the horizontal sense data line 121s includes a plurality of protrusions (not shown) and the protrusions may form one sensing unit together with a part of the vertical sense data line 171s.

In the illustrated exemplary embodiment of FIG. 26, a part to which a contact such as pressure, or the like is applied from the outside may be an outer surface of the insulating substrate 110 of the lower display panel 100, and when the contact is applied to the corresponding part from outside, a dielectric constant between the protrusion 174s of the vertical sense data line 171s and the horizontal sense data line 121s is changed, such that the sense data signals of the vertical sense data line 171s and the horizontal sense data line 121s may be changed.

In the exemplary embodiments shown in FIGS. 22 to 26, the horizontal sense data line 121s is on the same layer as the first and second gate lines 121a and 121b, and the vertical sense data line 171s is on the same layer as the data line 171. However, the horizontal sense line 121s and the vertical sense line 171s may be on layers contrary to this configuration. As long as the horizontal sense data line 121s and the vertical sense data line 171s are not short-circuited to each other, the horizontal sense data line 121s and the vertical sense data line 171s may be on various layers in addition to the same layers of the first and second gate lines 121a and 121b or the data line 171.

As described above, according to exemplary embodiments of the invention, it is possible to minimize decrease in aperture ratio of a display device, while decreasing the number of data driving integrated circuit chips of a touch sensible display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch sensible display device, comprising:
a display panel,
wherein the display panel includes,
a plurality of pixels arranged in a matrix including pixel rows extending in a row direction, and pixel columns extending in a column direction,
a plurality of image data lines which transfers image data signals to the plurality of pixels, and each of the plurality of image data lines is positioned between first adjacent pixels and each one of the plurality of image data lines is connected to pixels in two pixel columns,
a plurality of image scanning lines which transfers image scanning signals to the plurality of pixels, wherein pairs of image scanning lines are positioned above and below one pixel row, respectively, and two image scanning lines are between adjacent pixel rows,
a plurality of first sense data lines which transfers first sense data signals, and each of which positioned between second adjacent pixels without an image data line interposed therebetween,
a plurality of second sense data lines which transfers second sense data signals, wherein a second sense data line of the plurality of second sense data lines is between the two image scanning lines between the adjacent pixel rows, and
a plurality of sensing units which is connected with the plurality of first sense data lines and with the plurality of second sense data lines, and senses a touch to the display panel.

2. The touch sensible display device of claim 1, wherein:
the plurality of image data lines and the plurality of first sense data lines extend in the column direction.

3. The touch sensible display device of claim 2, wherein:
the plurality of image scanning lines extend in the row direction, and each of the pairs of the image scanning lines is connected to pixels in the one pixel row.

4. The touch sensible display device of claim 3, wherein:
the plurality of second sense data lines extends in the row direction, and of which each one is disposed in every one pixel row.

5. The touch sensible display device of claim 4, wherein the plurality of sensing units comprises a plurality of first sensing units connected with the plurality of first sense data lines, and
one first sensing unit is disposed in the every one pixel row.

6. The touch sensible display device of claim 5, wherein:
the plurality of sensing units further comprises a plurality of second sensing units which is connected with the plurality of second sense data, and
one second sensing unit is disposed in every one pixel column.

7. The touch sensible display device of claim 1, wherein:
the plurality of second sense data lines extends in the row direction, and of which each one is disposed in every one pixel row.

8. The touch sensible display device of claim 7, wherein:
the plurality of image scanning lines extend in the row direction, and each of the pairs of the image scanning lines are connected to the one pixel row.

9. The touch sensible display device of claim 7, wherein:
the plurality of sensing units comprises a plurality of first sensing units connected with the plurality of first sense data lines, and
each one first sensing unit is connected with one second sense data line.

10. The touch sensible display device of claim 1, wherein:
the plurality of sensing units comprises a plurality of first sensing units connected with the plurality of first sense data lines, and one first sensing unit is disposed in every one pixel row.

11. The touch sensible display device of claim 1, wherein:
the plurality of sensing units comprises a plurality of second sensing units which is connected with the plurality of second sense data lines, and
one second sensing unit is disposed in every one pixel column.

12. A touch sensible display device, comprising:
a first substrate and a second substrate facing each other;
a plurality of image scanning lines on the first substrate;
a plurality of image data lines on the first substrate;
a plurality of first sense data lines on the first substrate;
a plurality of second sense data lines on the first substrate,
a plurality of sensing units connected with the plurality of first sense data lines and the plurality of second sense data lines, and sensing a touch to the first substrate or the second substrate, and
a plurality of pixel electrodes which is arranged in a matrix including pixel electrode rows extending in a row direction and pixel electrode columns extending in a column direction, connected with the image scanning lines and the image data lines through switching elements, and receives image data signals,
wherein
pairs of image scanning lines are positioned above and below a pixel electrode row, respectively, and two image scanning lines are between adjacent pixel electrode rows,
a second sense data line of the plurality of second sense data lines is between the two image scanning lines between the adjacent pixel electrode rows,
each of the plurality of image data lines is positioned between two first adjacent pixel electrodes, respectively, and each one of the plurality of image data lines is connected to pixel electrodes in two pixel electrode columns, and each of the plurality of first sense data lines is positioned between two second adjacent pixel electrodes without an image data line interposed therebetween.

13. The touch sensible display device of claim 12, wherein:
the plurality of image data lines and the plurality of first sense data lines extend in the column direction.

14. The touch sensible display device of claim 13, wherein:
the plurality of image scanning lines extends in the row direction and each of the pairs of the image scanning lines are connected to pixel electrodes in one pixel electrode row.

15. The touch sensible display device of claim 12, further comprising:
a pillar-type protrusion on the second substrate, and an opposed electrode overlapping the pillar-type protrusion,
wherein
the plurality of sensing units comprises a plurality of first sensing units which is connected with the plurality of first sense data lines, and a first sensing unit faces the pillar-type protrusion.

16. The touch sensible display device of claim 15, further comprising:
a common voltage line on the first substrate and including a portion overlapped with the first sense data lines.

17. The touch sensible display device of claim 15, further comprising:
a common voltage line on the first substrate and including portions adjacent to and separated from edges of a first sense data line in a plan view of the display device.

18. The touch sensible display device of claim 15, wherein:
the plurality of second sense data lines extends in the row direction, and of which each one is disposed in every one pixel electrode row.

19. The touch sensible display device of claim 18, wherein:
the plurality of sensing units comprises a plurality of second sensing units which is connected with the plurality of second sense data lines.

20. The touch sensible display device of claim 18, wherein:
the plurality of sensing units comprises a plurality of first sensing units connected with the first sense data lines.

21. The touch sensible display device of claim 12, wherein:
the plurality of sensing units comprises a plurality of first sensing units connected with the plurality of first sense data lines.

22. The touch sensible display device of claim 21, further comprising:
a pillar-type protrusion on the second substrate, and an opposed electrode overlapping the pillar-type protrusion,
wherein a first sensing unit faces the pillar-type protrusion.

23. The touch sensible display device of claim 12, further comprising:
a common voltage line on the first substrate and including a portion overlapped with the first sense data lines.

24. The touch sensible display device of claim 12, further comprising:
a common voltage line on the first substrate and including portions adjacent to and separated from edges of a first sense data line in a plan view of the display device.

25. The touch sensible display device of claim 12, wherein:
the plurality of sensing units is connected with the plurality of first sense data lines and the plurality of second sense data lines.

* * * * *